US012565058B1

(12) United States Patent     (10) Patent No.:   US 12,565,058 B1

Li     (45) Date of Patent:     Mar. 3, 2026

(54) METHODS AND SYSTEMS FOR DETECTING INFRARED SECURITY MARKS EMBEDDED IN A DOCUMENT

(71) Applicant: XEROX CORPORATION, Norwalk, CT (US)

(72) Inventor: Xing Li, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 18/928,607

(22) Filed: Oct. 28, 2024

(51) Int. Cl.
|  |  |
|---|---|
| *B42D 25/30* | (2014.01) |
| *B42D 25/382* | (2014.01) |
| *G06T 7/11* | (2017.01) |
| *G06T 7/62* | (2017.01) |
| *G06V 10/25* | (2022.01) |
| *G06V 10/56* | (2022.01) |
| *G06V 10/75* | (2022.01) |

(52) U.S. Cl.
CPC .............. *B42D 25/382* (2014.10); *G06T 7/11* (2017.01); *G06T 7/62* (2017.01); *G06V 10/25* (2022.01); *G06V 10/56* (2022.01); *G06V 10/751* (2022.01)

(58) Field of Classification Search
CPC ........... B42D 25/382; G06T 7/11; G06T 7/62; G06V 10/25; G06V 10/56; G06V 10/751
See application file for complete search history.

(56) References Cited

U.S. PATENT DOCUMENTS

| | | | | |
|---|---|---|---|---|
| 7,949,175 | B2 * | 5/2011 | Fan ...................... | G07D 7/2008 |
| | | | | 382/137 |
| 9,985,786 | B1 * | 5/2018 | Bhabbur ............... | G06F 3/0488 |
| 2007/0146806 | A1 * | 6/2007 | Ishihara ............... | H04N 1/0084 |
| | | | | 358/405 |

(Continued)

FOREIGN PATENT DOCUMENTS

| | | | | |
|---|---|---|---|---|
| EP | 1667073 | A1 * | 6/2006 | ............... G07D 7/08 |
| EP | 4266264 | A1 * | 10/2023 | ............. G06V 30/40 |
| WO | 2018/224108 | A1 | 12/2018 | |

OTHER PUBLICATIONS

Gopalakrishnan et al., "Methods and Systems for Extracting an Infrared Security Mark From a Document," U.S. Appl. No. 18/915,919, filed Oct. 15, 2024.

(Continued)

*Primary Examiner* — Tuyen K Vo

(74) *Attorney, Agent, or Firm* — MH2 Technology Law Group LLP

(57) ABSTRACT

Methods and systems for detecting one or more infrared (IR) security marks embedded in a document include receiving a document including one or more regions of interest (ROIs), wherein the ROIs correspond to pre-defined locations in the document. Thereafter, the ROIs are processed to generate a plurality of arrays of counters corresponding to each ROI. Once generated, the plurality of arrays of counters are analyzed to identify a plurality of transition points corresponding to each ROI including the IR security mark. Thereafter, the transition points are used to calculated the (Continued)

size of the one or more IR security marks. Then, the calculated size is compared with the one or more IR security marks with a pre-defined size and, based on the comparison, the one or more IR security mark embedded in the document are detected for further analysis.

20 Claims, 9 Drawing Sheets

(56) References Cited

U.S. PATENT DOCUMENTS

| | | | |
|---|---|---|---|
| 2011/0121066 A1* | 5/2011 | Tian | G06K 19/14 |
| | | | 235/494 |
| 2012/0251715 A1 | 10/2012 | Dalal et al. | |
| 2021/0056287 A1* | 2/2021 | Schaumburg | G06V 30/2504 |
| 2022/0180113 A1* | 6/2022 | Patel | G06V 10/28 |
| 2023/0030524 A1 | 2/2023 | Gopalakrishnan et al. | |
| 2023/0394267 A1* | 12/2023 | Sagan | G06K 19/06056 |
| 2024/0083190 A1 | 3/2024 | Bichlmeier et al. | |
| 2024/0393433 A1* | 11/2024 | Elian | G01S 7/412 |
| 2025/0139647 A1* | 5/2025 | Balaji | G06Q 30/0185 |

OTHER PUBLICATIONS

Hermes, L. (Authorized officer), Extended European Search Report in corresponding European Application No. 25204268.4 mailed on Dec. 22, 2025, 10 pages.

* cited by examiner

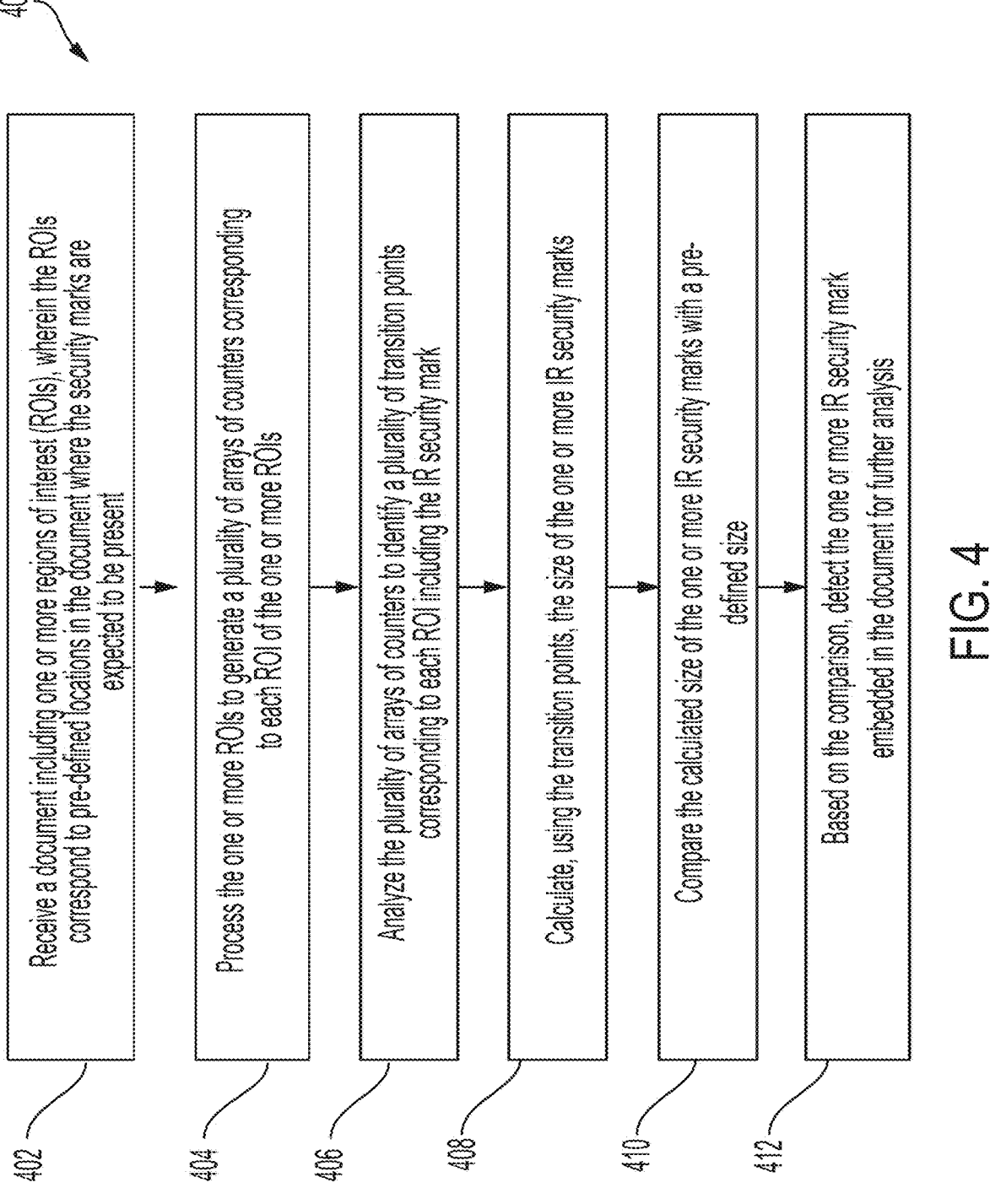

400

402 — Receive a document including one or more regions of interest (ROIs), wherein the ROIs correspond to pre-defined locations in the document where the security marks are expected to be present 404 — Process the one or more ROIs to generate a plurality of arrays of counters corresponding to each ROI of the one or more ROIs 406 — Analyze the plurality of arrays of counters to identify a plurality of transition points corresponding to each ROI including the IR security mark 408 — Calculate, using the transition points, the size of the one or more IR security marks 410 — Compare the calculated size of the one or more IR security marks with a pre-defined size 412 — Based on the comparison, detect the one or more IR security mark embedded in the document for further analysis

FIG. 4

METHODS AND SYSTEMS FOR DETECTING INFRARED SECURITY MARKS EMBEDDED IN A DOCUMENT

TECHNICAL FIELD

The present disclosure relates to the field of document security. More specifically, the disclosure relates to methods and systems for detecting infrared security marks embedded in a document.

BACKGROUND

Ensuring the security of confidential documents such as legal documents, research documents, contract documents, invoices, identity documents, or the like, is a big concern. And, organizations are deploying various techniques such as using watermarks, barcodes, QR codes, IR security marks, and so on, to protect confidential documents from copying, forging, and counterfeiting. Of these, protecting documents using IR security marks can offer security because the mark is invisible to the naked eye and difficult to decode and counterfeit. In other words, embedding IR security marks within the documents can help prevent counterfeiting, illegal alteration, and/or duplication of the documents.

In general, to read such security marks, devices such as IR scanners, IR cameras, or light sources are used. The use of such devices can add a level of security and may increase the overall cost, add dependency in the system, and so on. For example, if an IR scanner is not functioning due to various reasons, then there is no way to detect/read IR marks in the documents. Moreover, using the IR scanner to detect such marks in the documents can be a manual process.

In this light, there is a need for improved methods and systems to detect security marks.

SUMMARY

According to aspects illustrated herein, a method for detecting one or more infrared (IR) security marks embedded in a document is disclosed. The method includes receiving a document including one or more regions of interest (ROIs), wherein the ROIs correspond to pre-defined locations in the document. Thereafter, the one or more ROIs are processed to generate a plurality of arrays of counters corresponding to each ROI of the one or more ROIs. Once generated, the plurality of arrays of counters is analyzed to identify a plurality of transition points corresponding to a ROI including the IR security mark. Thereafter, the transition points are used to calculate the size of the one or more IR security marks. Then, the calculated size of the one or more IR security marks is compared with a pre-defined size, and based on the comparison the one or more IR security marks embedded in the document are detected for further analysis.

According to aspects illustrated herein, a multi-function device for detecting one or more infrared (IR) security marks embedded in a document is disclosed. The multi-function device includes a controller for receiving a document including one or more regions of interest (ROIs), wherein the ROIs correspond to pre-defined locations in the document. Further, the multi-function device includes a security mark detection module for: processing the one or more ROIs to generate a plurality of arrays of counters corresponding to each ROI; analyzing the plurality of arrays of counters to identify a plurality of transition points corresponding to a ROI including the IR security mark; calculating, using the transition points, size of one or more IR security marks; comparing the calculated size of the one or more IR security marks with a pre-defined size; and based on the comparison, detecting the one or more IR security mark embedded in the document for further analysis.

According to additional aspects illustrated herein, a method for detecting one or more infrared (IR) security marks embedded in a document is disclosed. The method includes receiving a document including one or more regions of interest (ROIs), wherein the ROIs correspond to pre-defined locations in the document; segmenting the received document into a plurality of tiles; assigning one or more worker threads to process one or more tiles of the plurality of tiles; upon processing, generating a plurality of arrays of counters corresponding to a ROI of the one or more ROIs; analyzing the plurality of arrays of counters to identify a plurality of transition points corresponding to a ROI including the IR security mark; identifying, using the transition points, coordinates of one or more IR security marks present in the document; calculating size of the one or more IR security mark using the coordinates of one or more IR security marks; comparing the calculated size of the one or more IR security marks with a pre-defined size; and based on the comparison, confirming the location of the one or more IR security marks in the document for detecting the one or more IR security mark embedded in the document.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for detecting a mark embedded in a document. The method includes receiving the document may include a region of interest (ROI), where the ROI corresponds to a location in the document. The method also includes generating an array of counters corresponding to the ROI, identifying, based on the array of counters, a transition point corresponding to the ROI including the mark, and calculating, using the transition point, a size of the mark. The method also includes comparing the calculated size with a pre-defined size, and, based on the comparison, detecting the mark in the document. Other embodiments of this aspect include corresponding computer systems, apparatus, and computer programs recorded on one or more computer storage devices, each configured to perform the actions of the methods.

Implementations may include one or more of the following features. The mark may include an infrared (IR) mark and/or a security mark. The ROI location may include a pre-defined location. The method may include determining the location automatically or manually. The ROI may include a data collection region, and the data collection region may include at least one of a long-line, a short-line-1 and a short-line-2. Generating the array of counters may include selecting a plurality of sample pixels from a plurality of rows of pixels in the data collection region, comparing values of the selected plurality of sample pixels with neighboring pixels, and updating, based on the comparison, a counter value associated with a row or a column including the plurality of sample pixels. Identifying, based on the array of counters, the transition point may include selecting a set of data elements from the array of counters, where the set may include at least four data elements, and calculating, from the set, at least one of a sum_of_4_low value and a sum_of_4_high. The method may include comparing the calculated sum_of_4_low value with a pre-defined white-count value to determine at least one of a black-to-white transition point or a point corresponding to a white portion. The method may include comparing the calculated sum_of_4_high value for the set with a pre-defined black-count value to determine at least one of a white-to-black transition point or a point corresponding to a black portion. The method may include segmenting the received document into a plurality of tiles, and processing the plurality of tiles in parallel. Implementations of the described techniques may include hardware, a method or process, or computer software on a computer-accessible medium.

One general aspect includes a computer system for detecting a mark embedded in a document. The computer system includes a hardware processor, and a non-volatile storage medium storing instructions that when executed by the hardware processor perform operations that may include receiving the document may include a region of interest (ROI), where the ROI corresponds to a ROI location in the document, generating an array of counters corresponding to the ROI, identifying, based on the array of counters, a transition point corresponding to the ROI including the mark, identifying, using the transition point, coordinates of the mark, calculating a size of the mark based on the coordinates, comparing the calculated size with a pre-defined size, and based on the comparison, detecting the mark in the document. Other embodiments of this aspect include corresponding computer systems, apparatus, and computer programs recorded on one or more computer storage devices, each configured to perform the actions of the methods.

Implementations may include one or more of the following features. The mark may include an infrared (IR) mark and/or a security mark. The ROI location may include a pre-defined location. The operations may include segmenting the received document into a plurality of tiles, and assigning one or more worker threads to process one or more tiles of the plurality of tiles. The operations may include analyzing one or more portions of the ROI covered by one or more data collection regions, where the one or more data collection regions includes at least one of a long-line, a short-line-1 and a short-line-2, selecting a plurality of sample pixels from a plurality of rows of pixels covered by the one or more data collection regions, comparing color values of the selected sample pixels with neighboring pixels, and based on the comparison, updating a counter value associated with a row or a column including the sample pixel. Analyzing the plurality of arrays of counters includes selecting a plurality of sets from each array of counters, where each set may include four data elements, calculating a sum_of_4_low value and a sum_of_4_high value for each set, comparing the calculated sum_of_4_low value for each set with a pre-defined white-count value to determine at least one of a black-to-white transition point or a point corresponding to a white portion, and comparing the calculated sum_of_4_high value for each set with a pre-defined black-count value to determine at least one of a white-to-black transition point or a point corresponding to a black portion. Implementations of the described techniques may include hardware, a method or process, or computer software on a computer-accessible medium.

One general aspect includes a computer program product for detecting a mark embedded in a document, the computer program product comprising a computer-readable storage medium having program instructions embodied therewith, the program instructions executable by a computing device to cause the computing device to perform operations including receiving the document may include a ROI, where the ROI corresponds to a location in the document. The operations include generating an array of counters corresponding to the ROI, identifying, based on the array of counters, a transition point corresponding to the ROI including the mark, calculating, using the transition point, a size of the mark, comparing the calculated size with a pre-defined size, and, based on the comparison, detecting the mark in the document. Other embodiments of this aspect include corresponding computer systems, apparatus, and computer programs recorded on one or more computer storage devices, each configured to perform the actions of the methods.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIG. 4 illustrates a method flowchart for detecting infrared (IR) security marks embedded in a document, in accordance with embodiments of the present disclosure.

DESCRIPTION

Figure 1:
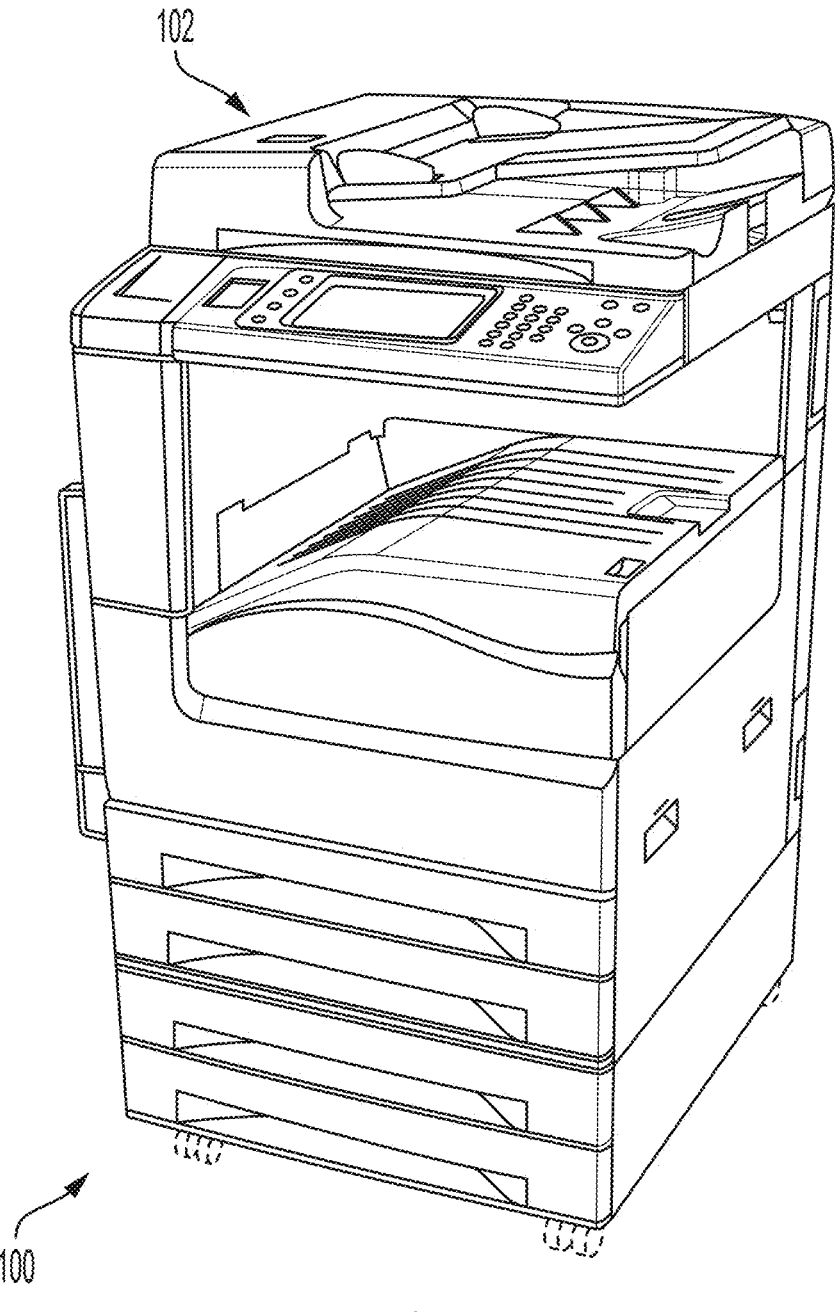
FIG. 1 shows an exemplary environment in which various embodiments of the present disclosure can be practiced.

Configurations in accordance with embodiments of the present disclosure are explained in detail herein with reference to the various drawings. The configurations are described to illustrate the disclosed subject matter, not to limit its scope, which is defined by the claims. Those of ordinary skill in the art will recognize a number of equivalent variations of the various features provided in the description herein.

Definitions of one or more terms that are used in the document are provided herein. It is understood that the definitions are provided for clarity and are intended to cover further configurations in addition to the configurations described herein.

The term "multi-function device" is a single device or a combination of multiple devices, to perform one or more functions such as, but not limited to, printing, scanning, imaging, or the like. Further, the term "multi-function device" also refers to include stand-alone scanners, single-function scanners, and the like. The multi-function device may include software, hardware, firmware, or a combination thereof. In the context of the current disclosure, the multi-function device detects one or more infrared (IR) security marks embedded in a document for various purposes, such as but not limited to verifying the genuineness/authenticity/originality/confidentiality of the document.

The term "document" refers to any document having confidential information or otherwise confidential for individual users, organizations, nations, or the like. Various examples of such confidential documents may be, but not limited to, cheques, legal documents, bank bonds, research data, contract documents, prescriptions, coupons, tickets, invoices, or disclosure documents. The document may include content in the form of text, images, graphics, or a combination thereof. The document can be in physical form such as printed on paper or can be in digital form.

The term "security mark" refers to a mark added/printed/ embedded in the document for various purposes, its such as but not limited to ensuring authenticity/genuineness/origi- nality/confidentiality. One such example is an IR security mark which is added to secure the document. The IR security mark includes hidden marks which can be in the form of texts, images, signs, or the like. Further, the IR security mark includes a pattern that surrounds the hidden marks such that the user cannot see the hidden marks with the naked eye. The pattern can be a dot pattern, and the pattern together with the hidden marks forms the IR security mark and can also be referred as an IR security patch or just the security mark. Further, the IR security mark can be of, for example, but not limited to, a horizontal security mark or a vertical security mark. In the horizontal security mark, the hidden marks, i.e., embedded texts/images are horizontally aligned and in the vertical security mark, the hidden marks are vertically aligned. Other configurations are contemplated by this dis- closure.

The term "tile" refers to a portion of the document. In the context of the disclosure, a received document or scanned data generated post-scanning is segmented into multiple tiles such that the width of the tile (i.e., span of the tile in the horizontal direction) is same as (or close to) the width of the scanned data (i.e., span of the scanned data in the horizontal direction). And, a tile can include one or more rows of pixels.

The term "pre-defined locations" in the context of the security mark, refers to one or more locations in the docu- ment where the IR security mark can be located. For example, the document can include eight pre-defined loca- tions, i.e., the IR security mark/patch can be located at one or more locations of the eight pre-defined locations. Here, the eight pre-defined locations include, for example, but not limited to, the top right corner, the bottom right corner, the top left corner, and the bottom left corner corresponding to both the horizontal security mark and the vertical security mark.

The term "Region of interest" refers to a region or portion on a page of the document corresponding to the pre-defined locations where the IR security marks are expected to be present. In configurations in which documents include eight pre-defined locations that include the corners corresponding to the horizontal security mark and the vertical security mark. The regions of the scanned data or received document corresponding to pre-defined locations are referred to herein as regions of interest (ROI), the regions corresponding to the pre-defined locations of horizontal security mark are referred as horizontal ROI and the regions corresponding to the pre-defined locations of vertical security mark are referred as vertical ROI. In some configurations, a document can include eight ROIs.

The term "array of counters" refers to an array or collec- tion of multiple data elements which are counters. A counter is assigned to a row/column including a sample pixel, and values of the counters are initially set as '0'. Based on the analysis of the pixels, the counters or counter values are updated.

The term "transition point" with reference to the array of counters refers to a data element of the array after which the value of subsequent data elements change significantly. For example, in an array of counters {24, 23, 25, 24, 26, 24, 23, 6, 9, 7, 8, 9 . . . }, the seventh data element (which is '23') of the array can be considered as the transition point, as the values of the subsequent data elements change significantly. For the identification of the transition points, a data element of the array is analyzed and compared with a threshold value. Further, the transition points are used to identify points on the document at which the transition from a non-security mark portion to a security mark portion occurs and points on the document at which the transition from the security mark portion to the non-security mark portion occurs. The point at which the transition occurs from the non-security mark portion to the security mark portion is referred as "white-to-black" transition point and the point at which the transition occurs from the security mark portion to the non-security mark portion is referred as "black-to-white" transition point.

The term "size" in the context of the IR security mark refers to the size or dimension of the IR security mark, specifically, the IR security mark present in a ROI.

The term "pre-defined size" refers to a size value stored/ defined in advance by, for example, but not limited to, a user such as an admin user. The pre-defined size indicates the size of an IR security mark that is expected to be present in a document, therefore, the pre-defined size is used to verify the presence of the IR security mark in the document.

The term "user" includes an entity that submits the document at the multi-function device. This user knows/ understands information, e.g., the size of the IR security mark, relevant for implementing the present disclosure.

In the present disclosure, methods and systems for detect- ing infrared (IR) security marks embedded in documents are described. Specifically, the disclosure relates to methods and systems to identify and confirm the location of the IR security mark in the document to extract and ascertain the authenticity/genuineness of the IR security mark for various purposes, such as but not limited to, detecting the authen- ticity/genuineness/originality/confidentiality of the docu- ment. According to the disclosure, a scanning/printing device, such as a multi-function device analyzes a received document, specifically, regions of interest (ROIs) or pre- defined locations in the received document to identify and confirm the location of the IR security mark in the docu- ment. The document can include one or more ROIs, for example, but not limited to, eight ROIs that may include the IR security mark. Based on the analysis of the ROIs in the document, the multi-function device identifies the ROI that includes the IR security mark. Once identified, the multi- function device extracts the IR security mark and verifies the authenticity/genuineness of the IR security mark. Based on the detection of the IR security mark, the multi-function device may take a desired action. In some configurations, the multi-function device may notify an owner of the document or an admin user. In some configurations, the multi-function device may abort the processing of the document if the document including the IR security mark is submitted for printing/scanning/copying.

FIG. 1 shows an environment 100 in which various configurations of the present disclosure can be practiced. The environment 100 includes a multi-function device 102 that provides one or more functionalities such as printing, scanning, imaging, and so on. The multi-function device 102 is an example of the environment 100 that may include scanners or any devices with scanning and/or printing functionality. The multi-function device 102 detects the location of an Infrared (IR) security mark embedded in a document for various purposes, such as but not limited to, extracting and ascertaining the authenticity/genuineness/originality/confidentiality of the document.

In general, users/individuals and organizations deal with different documents such as cheques, legal documents, bank bonds, research data, contract documents, prescriptions, coupons, tickets, invoices, disclosure documents, and the like. These documents include different types of content including texts, images, graphics, etc. Further, such documents include different security marks such as barcodes, watermarks, QR codes, or the like, to prevent the documents from any malicious activity, such as counterfeiting, duplication, and the like. The document can include one or more IR security marks. The IR security mark includes hidden marks which can be in the form of texts, images, signs, or a combination thereof. And, the hidden marks are surrounded or hidden by a pattern such that the user cannot see it with the naked eye. The pattern and the hidden marks together form the security mark and are collectively referred as an IR security mark/patch or security mark. Further, the IR security mark or the IR patch can be located at pre-defined locations in the document. And, ROIs corresponding to pre-defined locations on a document are submitted at the multi-function device 102.

Operationally, a document including an IR security mark is received at the multi-function device 102. The document can be in a physical form, such as printed on paper, or can be in a digital form. The digital form/version can be submitted from a computing device (not shown), and the physical form/version can be submitted directly at the multi-function device 102. In some configurations, a user submits the document for scanning in physical form. The multi-function device 102 processes the received document, specifically the ROIs in the document and identifies the ROI/pre-defined location that includes the IR security mark. The multi-function device 102 processes the one or more ROIs parallelly. The multi-function device 102 segments the received document into multiple tiles and assigns one or more worker threads to process the one or more tiles. While processing, the multi-function device 102, specifically, the assigned worker threads analyze different portions, i.e., the pixels, of the ROIs in the document. Based on the analysis, the multi-function device 102 identifies the ROI that includes the IR security mark. Once identified, the multi-function device 102 extracts the IR security mark and analyzes the extracted IR security mark to confirm the authenticity/genuineness of the IR security mark. In some configurations, the multi-function device 102 analyzes the IR security mark to determine the authenticity/genuineness/originality/confidentiality of the document including the IR security mark.

Figure 2:
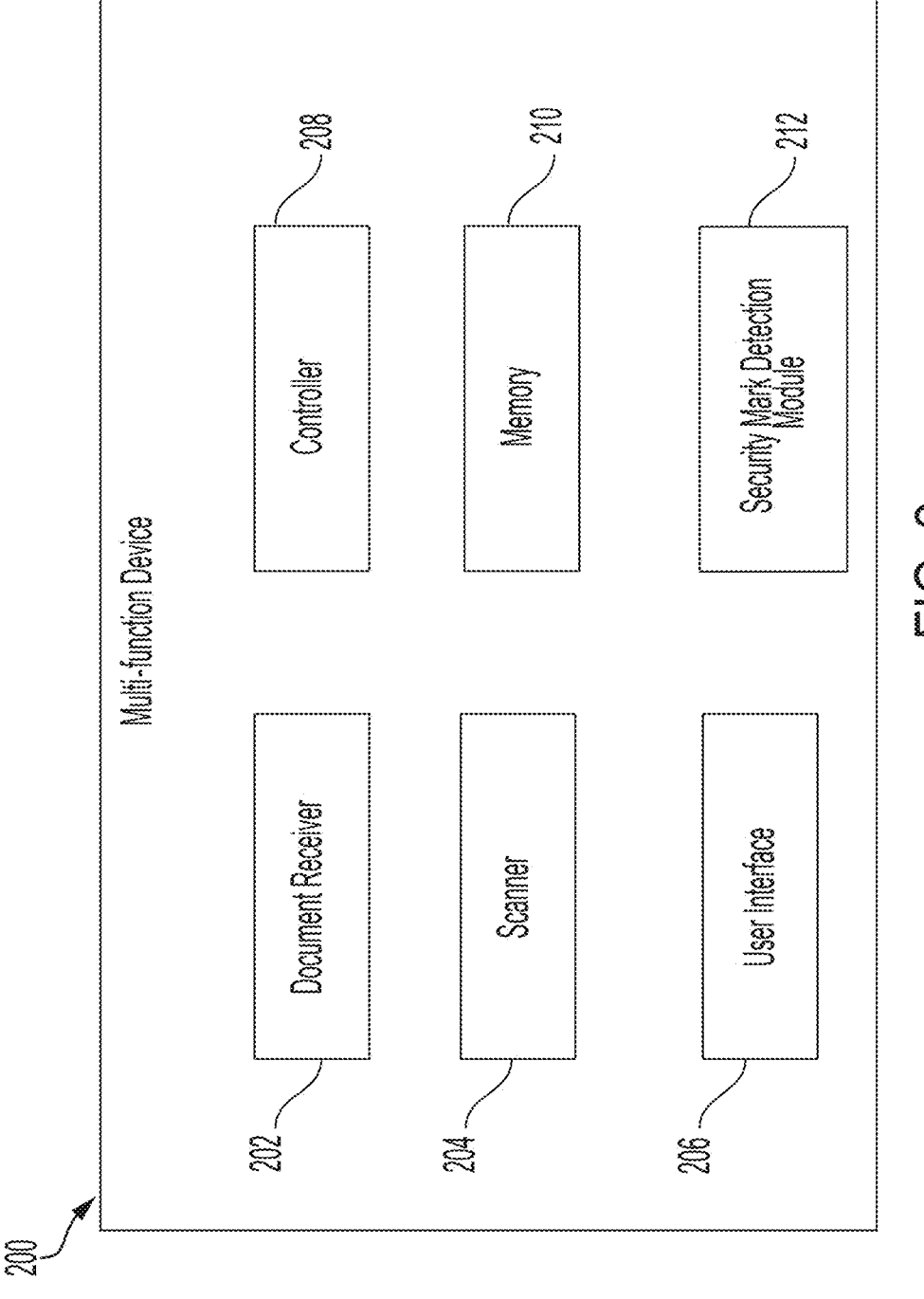
FIG. 2 is a block diagram illustrating various components of a multi-function device, in accordance with embodiments of the present disclosure.

FIG. 2 is a block diagram illustrating various components of a multi-function device 200 for implementing the present disclosure. As shown, the multi-function device 200 includes a document receiver 202, a scanner 204, a user interface 206, a controller 208, a memory 210, and a security mark detection module 212. Although, the security mark detection module 212 is shown as an independent module. The security mark detection module 212 can be a component of the controller 208, and the functionalities of the security mark detection module 212 can be performed by the controller 208 within the scope of the present disclosure. The components 202-212 are electronically coupled and communicate electronically. The multi-function device 200 may further include additional component(s).

Figure 3A:
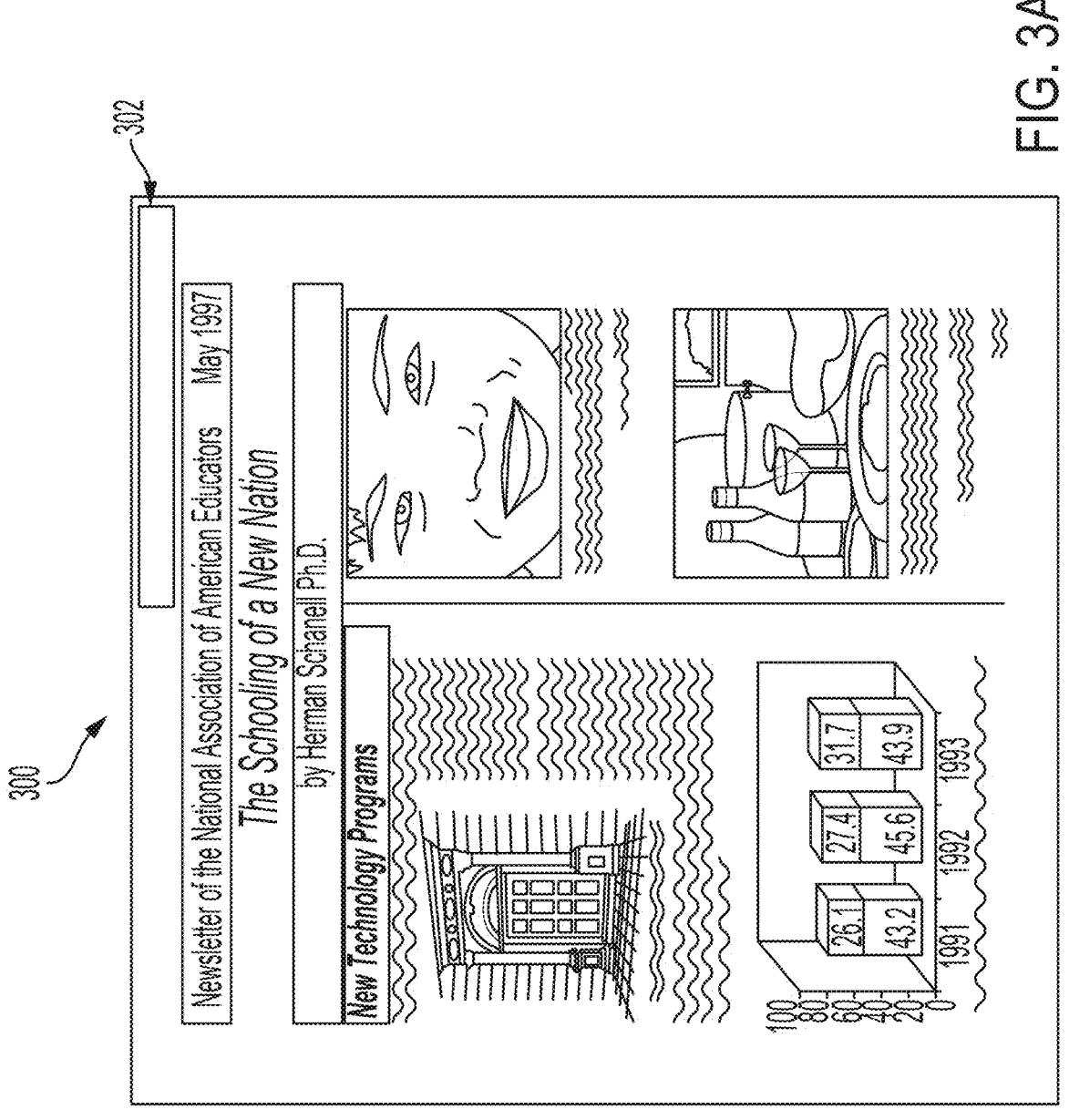
FIGS. 3A-3H are snapshots, in accordance with embodiments of the present disclosure.
Figure 3B:
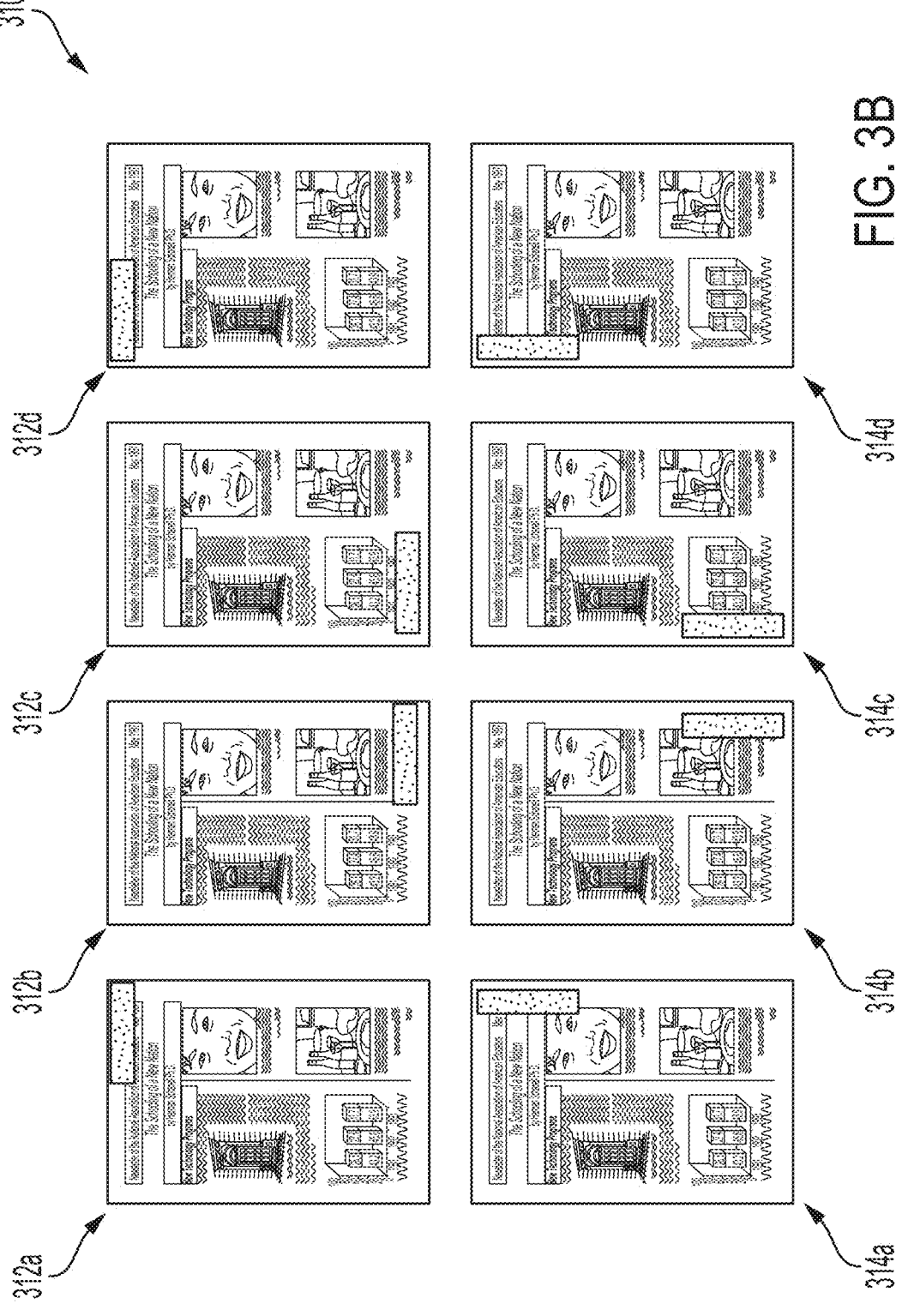

The multi-function device 200 receives a document for processing. The document includes confidential content and one or more infrared (IR) security marks. The document can be a multi-page document and may include the IR security mark on one or more pages of the confidential document. The IR security mark includes hidden marks which can be in the form of texts, images, signs, or a combination thereof. And, the hidden marks are surrounded or hidden by a pattern such that the user cannot see it with the naked eye. The pattern can be a dot pattern and collectively, the pattern and the hidden marks can be referred to as a security mark or IR security mark/patch. A snapshot of a document 300 is shown in FIG. 3A. The document 300 includes content such as text, images, etc. The document 300 also includes an IR security mark 302 which further includes one or more hidden marks in the form of text, images, etc. (not visible). Further, the IR security mark can be, for example, but not limited to, a horizontal security mark or a vertical security mark. In the horizontal security mark, the hidden marks, i.e., embedded texts/images are horizontally aligned and in the vertical security mark, the hidden marks are vertically aligned. Furthermore, on a particular page of a document, the IR security mark can be located at one or more pre-defined locations. The type of security mark can be positioned at a pre-defined location, for example, top right, bottom right, top left, and bottom left of the document. The IR security mark can be located at a pre-defined location. FIG. 3B illustrates a snapshots of a document 310 showing eight possible locations, where the IR security mark or security mark can be present in the document, based on the type of the security mark. Accordingly, four possible locations where the horizontal security mark can be present are shown as 312a, 312b, 312c, or 312d. Similarly, four possible locations where the vertical security mark can be present are shown as 314a, 314b, 314c, or 314d.

The document is received at the multi-function device 200 by placing the document at the document receiver 202 such as a platen or an automatic document handler (ADH). Thereafter, the user interface 206 of the multi-function device 200 can display one or more options such as scan, print, workflow, copy, fax, and so on. The user interface 206 displays an option "security mark detection workflow," and the user interface 206 can receive the selection of the option or can execute a default selection of the option. The option enables scanning of the document and detection of the presence of the infrared security mark in the document. The controller 208 triggers the scanner 204 to scan the document.

The scanner 204 scans the document and generates a scanned image. The scanned image can be, for example, but not limited to, a raster image, i.e., grid of pixels. The scanned image can include color values of the pixels in a color space format, for example, but not limited to an RGB (Red-Green-Blue) color space. Once generated, the controller 208 forwards the scanned image to the security mark detection module 212 for further processing.

The security mark detection module 212 processes the received scanned data, specifically, regions of the scanned data corresponding to the pre-defined locations, to identify the location of the security mark. The regions of the scanned data (or received document) corresponding to pre-defined locations are referred as regions ROIs. Therefore, the document includes one or more ROIs and the security mark detection module 212 analyzes the ROIs in the scanned data to identify one or more ROIs that include the IR security mark.

Figure 3C:
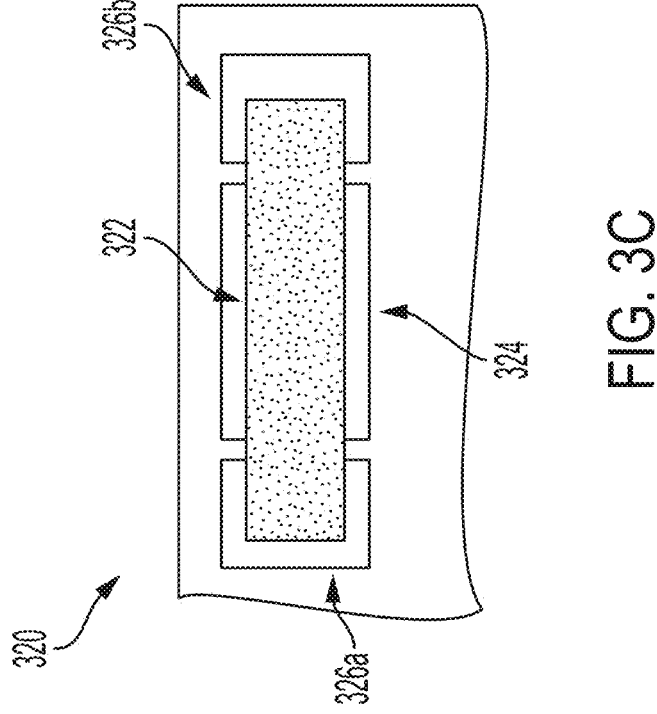

While processing the ROIs, the security mark detection module 212 analyzes different portions of the ROIs, specifically the security mark detection module 212 analyzes color values of different pixels/portions of the ROIs. For this, the security mark detection module 212 uses one or more sample windows which can be referred as data collection regions. And, while processing the ROI, the security mark detection module 212 analyzes the color values of portions/pixels covered by the different data collection regions. Here, the security mark detection module 212 uses a data collection region of a first length and other short data collection regions of a second length. The sizes of the data collection regions depend upon the size of the security mark that may be present in the document. And, the size of the data collection region can be pre-defined. In some configurations, the first size can be 1040 pixels*560 lines/rows of pixels for 600 dpi scan. In some configurations, the second length can be 256 pixels*288 lines/rows of pixels for 600 dpi scans. The first length data collection region is referred herein as long-line and the second length data collection regions are referred as short-line-1 and short-line-2. The security mark detection module 212 uses the long-line (long data collection region) to process the central portion of the ROI and the other two data collection regions, i.e., the short-line-1 and short-line-2 to process the two ends of the ROI. FIG. 3C illustrates a snapshot 320 of different data collection regions labeled as 324, 326a and 326b which cover different portions of an IR security mark/ROI 322. The data collection region 324 covers the central portion of the IR security mark/ROI 322 and the data collection regions 326a and 326b cover the two ends of the IR security mark/ROI 322. The data collection region 324 is referred as long-line and the data collection regions 326a and 326b are referred as short-line-1 and short-line-2, respectively.

While processing the portions/pixels covered by the different data collection regions (i.e., the longline, short-line-1 and short-line-2), the security mark detection module 212 selects one or more sample pixels from the rows of pixels covered by the data collection regions, and compares the selected sample pixels with neighboring pixels for further analysis. The security mark detection module 212 selects the sample pixels after a gap of a pre-defined number of rows. Therefore, the security mark detection module 212 selects the sample pixels from the plurality of rows of pixels, such that there is a gap of a pre-defined number of rows between the two rows including the sample pixels. In some configurations, the gap is selected based on the type of ROI (i.e., horizontal ROI or vertical ROI), type of data collection region (short-line or long-line), etc. Further, for a row including the sample pixel, the security mark detection module 212 selects multiple sample pixels. The gap between the adjacent sample pixels can be, for example, but not limited to, pre-defined. In some configurations, the gap is selected based on the type of ROI (i.e., horizontal ROI or vertical ROI), type of data collection region (short-line or long-line), etc.

The security mark detection module 212 compares the selected sample pixels with neighboring pixels. The neighboring pixels are pixels that are in the same row as the sample pixel and are at a distance from the sample pixel in a direction, where the distance and the direction can be, but are not limited to being, pre-defined. In some configurations, the distance/gap between the sample pixel and the neighboring pixel is selected based on the type of ROI (i.e., horizontal ROI or vertical ROI), type of data collection region (short-line or long-line), etc. Further, the pre-defined direction can depend upon the location of the ROI. For example, for a ROI located at top left and bottom left, the pre-defined direction is towards right from the sample pixel, i.e., the security mark detection module 212 selects the neighboring pixel towards the right from the sample pixel. Similarly, for ROI located at the top right and bottom right, the pre-defined direction is towards the left from the sample pixel. This way, the security mark detection module 212 selects various sample pixels and compares the selected sample pixels with the neighboring pixels.

While comparing, the security mark detection module 212 compares the color value of the sample pixels with the neighboring pixels. In some configurations, if the color values are represented in RGB color space, then the differences for three color channels are calculated. Based on the comparison, the security mark detection module 212 increments a counter value associated with the row or column including the sample pixel. For example, if the difference between the color value of the sample pixel and the neighboring pixel is greater than a threshold, which may be, but is not limited to being, pre-defined, the security mark detection module 212 increments the counter value associated with the row or column including the sample pixel. To accomplish this, the security mark detection module 212 assigns a counter value corresponding to the row or column including the sample pixel. For example, to analyze the horizontal ROIs, for the long-line, the security mark detection module 212 assigns counter values corresponding to a row including the sample pixels. And for the short-lines (short-line-1 and short-line-2), the security mark detection module 212 assigns counter values corresponding to a column including the sample pixels. Further, to analyze the vertical ROIs, for the long-line, the security mark detection module 212 assigns counter values corresponding to a column including the sample pixels. And for the short-lines, the security mark detection module 212 assigns counter values corresponding to a row including the sample pixels. The counter values are stored in dedicated memory locations associated with a data collection region of the ROIs, and the counter values are initially set as '0'. This way, the security mark detection module 212 analyzes different portions of the ROIs and based on the analysis, generates one or more arrays of counters/counter values corresponding to the different portions of ROIs. Additional details regarding the processing of different ROIs are discussed below one by one with respect to different types of ROIs and different data collection regions associated with respective ROIs.

Figures 3D, 3E:
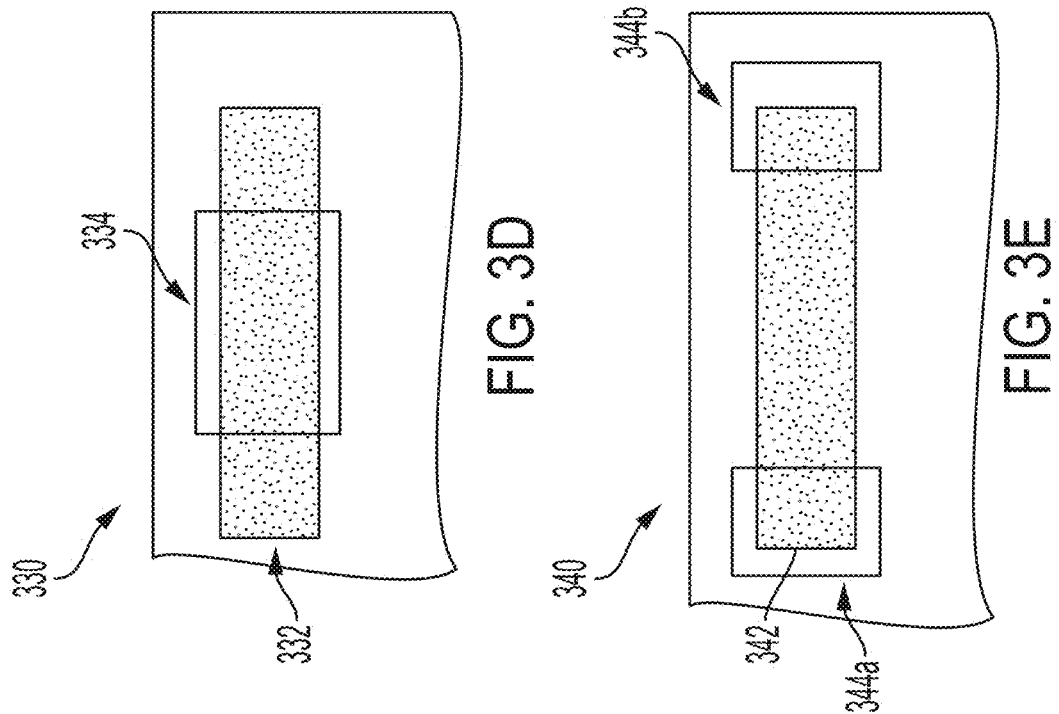

While processing the horizontal ROI located on the top right, the security mark detection module 212 analyzes the portions/pixels covered by different data collection regions, i.e., the long-line, short-line-1 and short-line-2. Here, the security mark detection module 212 processes the long-line to determine the height of the ROI, (i.e., span in the vertical direction), specifically, to determine the height of an IR security mark included in the ROI. Further, the security mark detection module 212 processes the short-line-1 and short-line-2 to determine the width of the ROI (i.e., span in the horizontal direction), specifically width of the IR security mark included in the ROI. FIG. 3D illustrates a snapshot 330 of a long-line data collection region labeled as 334 which covers a central portion of the security mark/ROI 332 located on the top right of the scanned data. To process the central portion of the security mark/ROI 332, the security mark detection module 212 analyzes the pixels/portions covered by the long-line 334. Similarly, FIG. 3E illustrates a snapshot 340 of data collection regions short-line-1 344a and short-line-2 344b covering the two ends of the security mark/ROI 342 located on the top right of the scanned data. To process the two ends of the security mark/ROI 342, the security mark detection module 212 analyzes the pixels/portions covered by short-line-1 344*a* and short-line-2 344*b*.

While processing the pixels covered by the long-line, as discussed earlier, the security mark detection module 212 selects multiple sample pixels and compares them with neighboring pixels which are located at a distance (e.g. 8 pixels). The security mark detection module 212 selects the neighboring pixels towards the left, as the ROI is located on the top right. While comparing, the security mark detection module 212 calculates the difference between color values of the sample pixels and neighboring pixels, and if the difference is greater than a threshold, then the security mark detection module 212 increments the counter value associated with the row including the sample pixel. Similarly, the security mark detection module 212 analyzes the other sample pixels. The distance between the adjacent sample pixels is, for example, but not limited to, 14 pixels. In some configurations, the distance between the two adjacent sample pixels is greater than the distance between the sample pixel and the neighboring pixel. The distance between the two rows including the sample pixels is, for example, but not limited to, 4 rows. The security mark detection module 212 selects one or more sample pixels from the rows of pixels covered by the long-line and compares them with neighboring pixels. Based on the comparison, the security mark detection module 212 updates the counter values associated with the row including the sample pixels, and generates an array of counters. The security mark detection module 212 analyzes the pixels covered by the long-line data collection region in other horizontal ROIs.

While processing the pixels covered by short-line-1 and short-line-2, the security mark detection module 212 selects the sample pixels and compares them with neighboring pixels which are located at, for example, but not limited to, 8 pixels towards left, as the ROI is located on the top right. Further, the distance between the two adjacent sample pixels is, for example, but not limited to, 4 pixels. In some configurations, the distance between the adjacent sample pixels is smaller than the distance between the sample pixel and the neighboring pixel. Furthermore, the distance between the two rows including the sample pixels is, for example, but not limited to, 10 rows. In some configurations, the distance between the rows including the sample pixels for the short-line-1 and short-line-2 is greater than the distance between the rows including the sample pixels for the long-line. Based on the comparison, the security mark detection module 212 updates the counter values associated with the column including the sample pixels. For example, if the difference between the color values of the sample pixel and the neighboring pixel is greater than a threshold, the security mark detection module 212 increments the counter value associated with the column including the sample pixel. The security mark detection module 212 selects the sample pixels from the rows of pixels covered by short-line-1 and short-line-2 and compares them with neighboring pixels. Based on the comparison, the security mark detection module 212 updates the counter values associated with a column including the sample pixels, and generates an array of counters. The security mark detection module 212 analyzes the pixels covered by short-line-1 and short-line-2 in other horizontal ROIs.

Figure 3G:
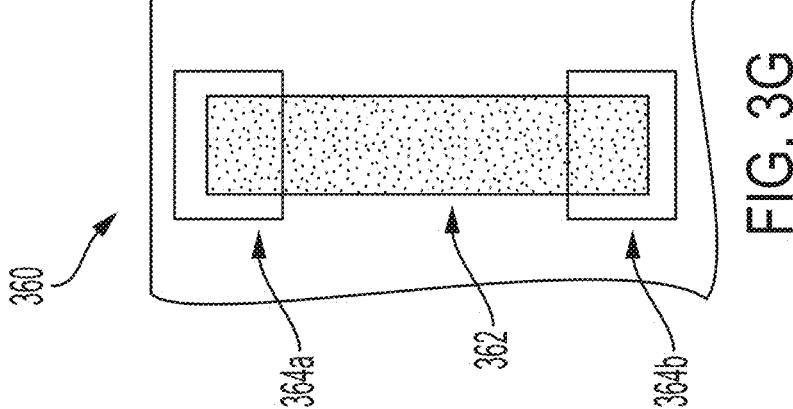
Figure 3F:
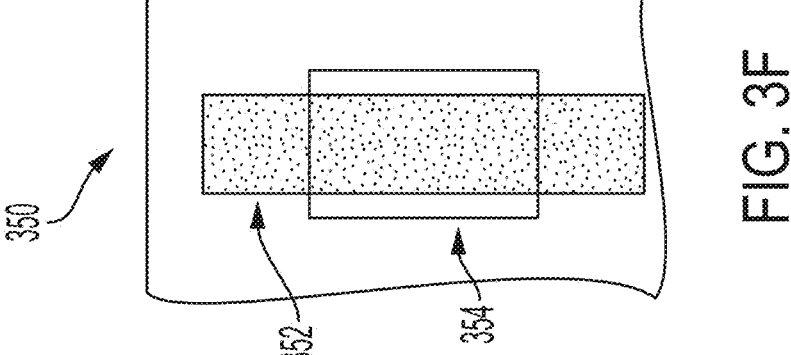

While processing the vertical ROIs located on the top right, the security mark detection module 212 analyzes the pixels covered by different data collection regions. For the vertical ROI, the security mark detection module 212 processes the long-line to determine the width of the ROI, (i.e., span in the horizontal direction), specifically the width of the IR security mark included in the ROI. The security mark detection module 212 processes the short-line 1 and short-line 2 to determine the height of the ROI, i.e., span in the vertical direction, specifically height of the IR security mark included in the ROI. FIG. 3F illustrates snapshot 350 of a long-line data collection region 354 which covers a central portion of the security mark or the ROI 352 located on the top right of the scanned data. To process the central portion of the security mark or the ROI 352, the security mark detection module 212 analyzes the pixels/portions covered by the long-line 354. FIG. 3G illustrates a snapshot 360 of data collection regions short-line-1 364*a* and short-line-2 364*b* covering the two ends of the security mark or the ROI 362 located on the top right of the scanned data. To process the two ends of the security mark or the ROI 362, the security mark detection module 212 analyzes the pixels/portions covered by short-line-1 364*a* and short-line-2 364*b*.

While processing the pixels covered by the long-line, the security mark detection module 212 selects the sample pixels and compares them with neighboring pixels which are located at, for example, but not limited to, 8 pixels towards the left, as the ROI is located on the top right. Further, the distance between the two adjacent sample pixels is, for example, but not limited to, 4 pixels. In some configurations, the distance between the adjacent sample pixels is smaller than the distance between the sample pixel and the neighboring pixel. The distance between the two rows including the sample pixels is, for example, but not limited to, 14 rows. In some configurations, the distance between the rows including the sample pixels for the long-line of the vertical ROI is greater than the distance between the rows including the sample pixels for the long-line of the horizontal ROI. Based on the comparison, the security mark detection module 212 updates counter values associated with the column including the sample pixel (instead of the row as in the case of long-line for the horizontal ROI). For example, if the difference is greater than a threshold, the security mark detection module 212 increments the counter value associated with the column including the sample pixel. The security mark detection module 212 selects the sample pixels from the plurality of rows of pixels covered by the long-line and compares them with neighboring pixels. Based on the comparison, the security mark detection module 212 updates the counter values associated with the column including the sample pixels, and generates an array of counters. The security mark detection module 212 analyzes the pixels covered by the long-line in other vertical ROIs, i.e., ROIs located at top left, bottom left, and bottom right.

While processing the pixels covered by the short-line-1 and short-line-2, the security mark detection module 212 selects the sample pixels and compares them with neighboring pixels which are located at the distance of, for example, but not limited to, 8 pixels towards the left, as the ROI is located on the top right. Further, the distance between the two adjacent sample pixels is, for example, but not limited to, 10 pixels. In some configurations, the distance between the adjacent sample pixels is greater than the distance between the sample pixel and the neighboring pixel. Furthermore, the distance between the two rows including the sample pixels is, for example, but not limited to, 4 rows. In some configurations, the distance between the rows including the sample pixels for the short-line-1 and short-line-2 is smaller than the distance between the rows including the sample pixels for the long-line. While comparing, the security mark detection module 212 calculates the difference between color values of the sample pixels and neighboring pixels and, if the difference is greater than a threshold, the security mark detection module 212 increments the counter value associated with the row including the sample pixel (instead of the column as in the case of long-line). The security mark detection module 212 selects the sample pixels from the plurality of rows of pixels covered by the short-line-1 and short-line-2 and compares them with neighboring pixels. Based on the comparison, the security mark detection module 212 updates the counter values associated with the row including the sample pixels, and generates an array of counters. Similarly, the security mark detection module 212 analyzes the pixels covered by the short-line-1 and short-line-2 in other vertical ROIs. The security mark detection module 212 analyzes the ROIs, specifically, portions of the ROIs covered by data collection regions, and generates one or more arrays of counters corresponding to a data collection region.

Figure 3H:
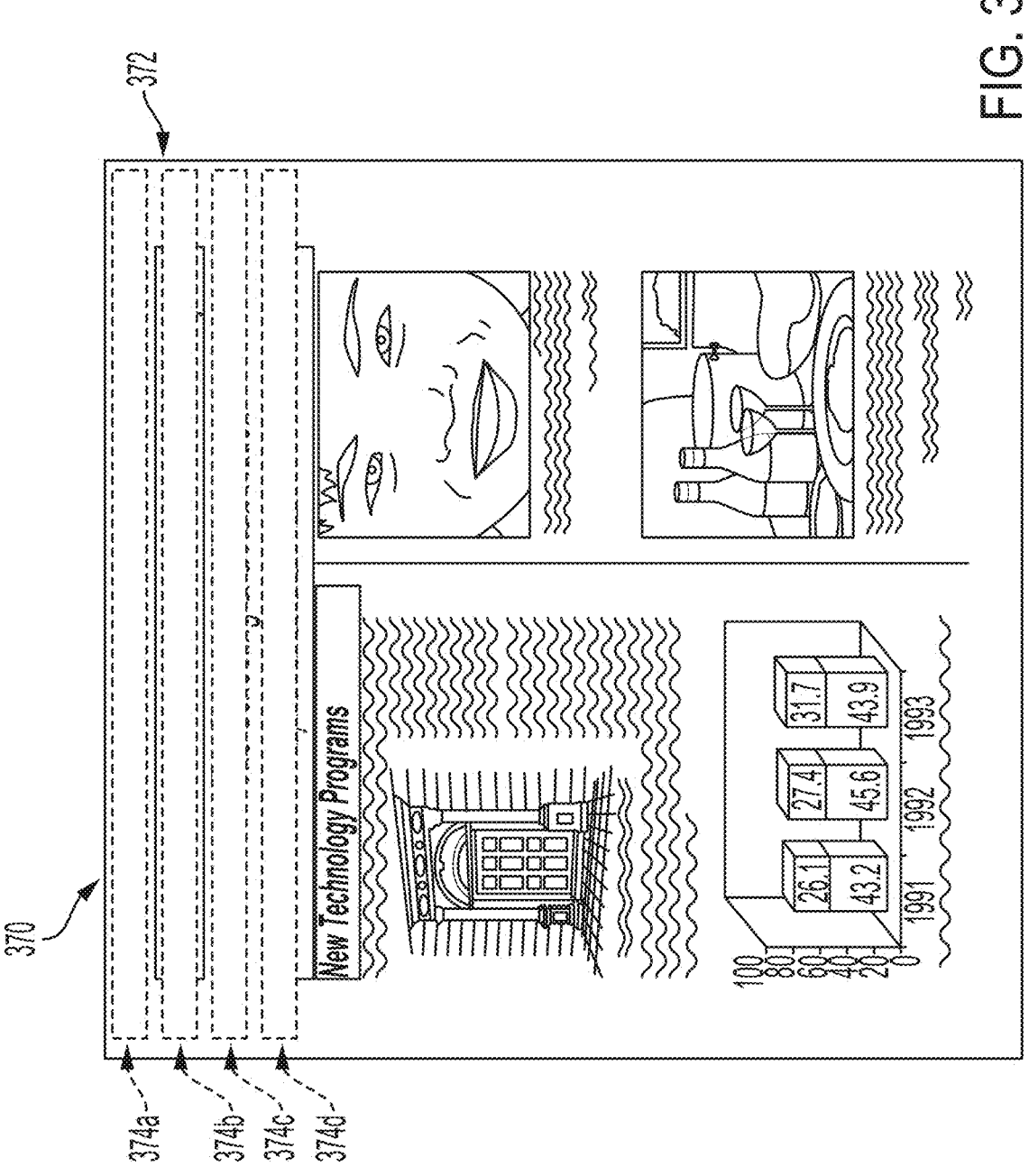

Further, the security mark detection module 212 processes the one or more ROIs parallelly. To accomplish this, upon receiving the scanned document post-scanning, the security mark detection module 212 segments the received scanned data into one or more tiles and processes the document on a tile-by-tile basis. The tile includes a portion or a strip of the image (scanned data) such that the width of a tile (i.e., span in the horizontal direction) is same as (or close to) the width of the image. The tile includes multiple rows of pixels which is the height (i.e., span in the vertical direction) of the tile. In some configurations, the tile includes 64 rows of pixels, therefore the height of the tile is 64 rows. FIG. 3H illustrates snapshot 370 of scanned data 372. The scanned data 372 is segmented into multiple tiles which are labeled as 374*a*, 374*b*, 374*c*, 374*d* and so on. The height of the tile can be smaller or greater than the height of the ROI. In some configurations, the height of the tile is smaller than the height of the ROI. In some configurations, the height of the tile is greater than the height of the ROI. To process a ROI, the security mark detection module 212 analyzes the tiles covering the ROI. A tile may partially cover multiple ROIs as the width of the tile can be equal to the width of the document, and the portion of the document that the tile covers may include portions of different ROIs. While processing the one or more tiles the security mark detection module 212 processes and collects data corresponding to different portions of the ROIs covered by the tiles. For example, if a tile, for example, tile 8, partially covers 4 ROIs (i.e . . . , horizontal and vertical ROIs located on the top left and top right), upon processing tile 8, the security mark detection module 212 generates data for the ROIs. The security mark detection module 212 segments the received scanned data or scanned document into multiple tiles and processes the document on a tile-by-tile basis. The security mark detection module 212 processes the tile, and while processing, data related to the portions (portions covered by the long-line, short-line-1 and short-line-2) of the ROIs covered by tile are collected.

To process the ROIs and their portions parallelly, the security mark detection module 212 assigns a worker thread to process the one or more tiles and thus the portions of the one or more ROIs covered by the tiles. For example, the security mark detection module 212 assigns worker thread 1 to process 8 tiles, for example, tile 1 to tile 8. To process the subsequent 8 tiles, for example, tiles 9 to 16, the security mark detection module 212 assigns worker thread 3. While processing the tiles, the assigned worker threads collect data related to the portions of different ROIs covered by the processed tiles. For example, if the tiles 1-8 cover portions of horizontal ROI located at top right and top left, and the worker thread 1 is assigned to process the tiles 1-8. Then, upon processing, the worker thread 1 generates data for different portions, i.e., long-line, short-line-1 and short-line-2 for both the ROIs (i.e., horizontal ROI located at top right and top left). Similarly, if the worker thread 3 is assigned to process the tiles 8-16, and the tiles 8-16 cover one or more portions of the horizontal ROI located at top left and top right and vertical ROI located at top left and top right, upon processing, the worker thread 3 generates data corresponding to different portions of the ROIs (i.e., horizontal and vertical ROIs located at top left and top right). This way, the worker threads process the assigned one or more tiles parallelly and independently. The security mark detection module 212 processes the portions of the document that may include the security mark or the ROIs. Therefore, the assigned worker threads process the tiles that cover portions of at least one or more ROIs. To accomplish this, while processing the tiles, the assigned worker threads check for the start and end position of the tile against possible ROIs to see if the tile contains any portions of the ROIs. If the tile includes a portion of any of the ROI, the worker thread proceeds forward with further processing, i.e., sampling, pixel value analysis, etc., otherwise, further processing is skipped. The security mark detection module 212 assigns different worker threads to process the document parallelly on a tile-by-tile basis.

The security mark detection module 212 assigns/allocates a chunk of memory locations to a worker thread to store data collected from multiple tiles. Specifically, corresponding to the portion (i.e., long-line, short-line-1 and short-line-2) of the ROI, the worker thread is assigned a chunk of memory to store data, for example, but not limited to, counter values. In other words, if a document includes 8 ROIs, a worker thread is assigned a chunk of memory corresponding to a data collection region (i.e., long-line, short-line-1 and short-line-2) for the ROIs, i.e., 8 ROIs. In some configurations, the starting location for storing data related to long-line of horizontal ROI located at top left, top right, bottom left, and bottom right are localMem+0, localMem+256, localMem+512 and localMem+768, respectively. In some configurations, starting location for storing data related to short-line-1 of horizontal ROI located at top left, top right, bottom left, and bottom right are localMem+2560, localMem+2688, localMem+2816, localMem+2944, respectively. Similarly, starting location for storing data related to short-line-2 of horizontal ROI located at top left, top right, bottom left, and bottom right are localMem+3584, localMem+3712, localMem+3840, at localMem+3968, respectively. This way, the security mark detection module 212 assigns/allocates a chunk of memory locations to a worker thread to store data collected from multiple tiles.

Upon processing the one or more tiles covering portions of one or more ROIs, the assigned worker thread stores the collected data in the allocated respective memory locations. For example, if the worker thread 1 is assigned to process the tiles 1-8 which partially cover portions of horizontal ROIs located at top right and top left. Then, upon processing, for the top left horizontal ROI, the worker thread 1 stores the collected data in the memory location associated with the top left horizontal ROI. And, for the top right horizontal ROI, worker thread 1 stores the collected data related in the memory location associated with the top right horizontal ROI. Here, for a particular worker thread, some of the assigned memory may remain empty at the end of the processing, as the tiles processed by the worker thread may not include portions/pixels of a particular ROI. Continuing with the previous example, as the worker thread 1 is assigned to process the tiles 1-8, which covers the horizontal ROI located at top left and top right. Therefore, the memory assigned to the worker thread 1 associated with other ROIs, i.e., horizontal ROIs located at the bottom (left and right) and vertical ROIs located at the bottom left, bottom right, top left, and top right, remain empty. This way, the security mark detection module 212 assigns worker threads to process the one or more tiles and collects data related to the one or more portions of the ROIs covered by the tiles. And, stores the data, i.e., the counter values, in the memory locations associated with the ROI. Thus, upon processing, the assigned worker threads generate arrays of counters corresponding to one or more portions of the ROIs covered by the processed tiles.

Thereafter, the security mark detection module 212 obtains a plurality of array of counters corresponding to a ROI, specifically corresponding to a data collection region of the ROIs. For example, if a horizontal ROI located at top left is covered by the tiles 1-24, and the worker thread 1 processes the tiles 1-8, worker thread 3 processes the tiles 9-16, and the worker thread 4 processes the tiles 17-24. Then, post-processing, the worker thread 1 generates one array of counters corresponding to a data collection region, i.e., long-line, short-line-1 and short-line-2 associated with the top left horizontal ROI. Similarly, the worker threads 3 and 4 generate 1 array of counters corresponding to a data collection region. Therefore, post-processing, 3 arrays of counters are generated corresponding to a data collection region, i.e., long-line, short-line-1 and short-line-2. This way, one or more arrays of counters are obtained corresponding to a data collection region of the ROIs. Also, upon processing of the tiles 1-24, the worker threads 1, 3 and 4 generate data (i.e., 3 arrays of counters corresponding to a data collection region) associated with the horizontal ROI located at the top right, because if tiles 1-24 includes the top left ROI, then the tiles 1-24 include the top right horizontal ROI.

Once obtained, the security mark detection module 212 combines the one or more arrays of counters associated with a data collection region and creates a single array of counters. For example, post analysis, if 3 arrays of counters are obtained corresponding to a data collection region (i.e., long-line, short-line-1 and short-line-2) associated with the top left horizontal ROI. Then, the security mark detection module 212 combines the 3 arrays of counters associated with the long-line and creates a single array of counters. Similarly, the security mark detection module 212 combines the 3 arrays of counters associated with short-line-1 and short-line-2 to generate one array of counters respectively for the short-line-1 and short-line-2. This way, the security mark detection module 212 generates three arrays of counters corresponding to a ROI, including one for long-line, one for short-line-1 and one for short-line-2.

Thereafter, the security mark detection module 212 performs filtration operation on data elements included in the three arrays associated with a ROI to generate a corrected array of counters. For this, the security mark detection module 212 compares the value of a data element with a threshold value. Here, the threshold value is different for different arrays. For example, the threshold value for arrays associated with the long-line can be 26 and for short-line can be 8. Based on the comparison, the security mark detection module 212 sets the value of one or more data elements included in the arrays. Here, the security mark detection module 212 may also consider the value of neighboring data elements before setting the value of a data element. In some configurations, if the security mark detection module 212 identifies that the value of a data element is lower than the threshold value (say 26) and the value of immediate neighbors on both sides is higher than the threshold value, then the security mark detection module 212 sets the value of the data element as a predetermined high value, say 27. In some configurations, if the threshold value is 25, the value of the predetermined high is 27, the value of the data element to be processed is 19, and the values of the immediate neighbors of the data element (to be processed) are 26 and 25. Then, upon filtration, the security mark detection module 212 sets the value of the data element as predetermined high, i.e., 27, as the value of the data element is less than the threshold and the value of the immediate neighbors of the data elements is greater than the threshold. This way, the security mark detection module 212 generates a corrected array of counters corresponding to a data collection region associated with the ROIs.

Once performed, the security mark detection module 212 analyzes the arrays associated with a ROI to identify the ROI which includes the security mark. For this, the security mark detection module 212 analyzes the data elements of the arrays to identify transition points, i.e., the points at which transition occurs from a non-security mark portion to a security mark portion and vice versa. Specifically, the security mark detection module 212 analyzes the arrays to identify the data element at/after which the values of the data element change. Accordingly, the security mark detection module 212 identifies the transition points which indicate the point at which transition occurs from a non-security mark portion (referred as white portion) to a security mark portion (referred as black portion) and from the security mark portion to the non-security mark portion. In the context of the disclosure, the point at which the transition occurs from the non-security mark portion to the security mark portion is referred as "white-to-black" transition point and the point at which the transition occurs from the security mark portion to the non-security mark portion is referred as "black-to-white" transition point.

While analyzing, the security mark detection module 212 selects a set of 4 data elements. In some configurations, the security mark detection module 212 selects the data elements using a sliding window, i.e., after selecting the first 4 data elements of the array, (e.g., data elements 1, 2, 3, and 4), the security mark detection module 212 leaves the first data element and selects the next four data elements (i.e., data elements 2, 3, 4 and 5), then the security mark detection module 212 selects the next four data elements (i.e., 3, 4, 5, 6) and so on. Further, for a set (of 4 elements), the security mark detection module 212 counts the number of elements that are greater than a threshold high value (e.g., 24) and the number of elements that are smaller than a threshold low value (e.g., 7). In the context of the disclosure, the count/number of data elements that are greater than a threshold high value is referred as sum_of_4_high, and the count/number of data elements that are smaller than a threshold low value is referred as sum_of_4_low. In some configurations, if the 4 elements of the set are (26, 25, 27, 5) and the value of threshold high is 23 and the value of threshold low is 7, then the value of sum_of_4_high is 3, as the value of three elements is greater than 23 and the value of sum_of_4_low is 1. The security mark detection module 212 uses the counts, i.e., sum_of_4_high and sum_of_4_low to identify the transition points in the arrays associated with the different data collection regions.

While processing the array associated with the longline, the security mark detection module 212 first checks whether the non-security mark portion is identified. Once the non-security mark portion is identified, the security mark detection module 212 checks for the transition from the non-security mark portion to the security mark portion to identify the beginning of the security mark. Thereafter, the security mark detection module 212 checks for the transition from the security mark portion to the non-security mark portion to identify the end of the security mark. To identify the non-security mark portion, the security mark detection module 212 compares the value of sum_of_4_low for a set with a pre-defined threshold value, which is referred as white-count (such as, for example, but not limited to, 3). Based on the comparison, the security mark detection module 212 determines whether the non-security mark portion is detected or not. For example, while analyzing the data elements of the array, whenever the security mark detection module 212 identifies that for a set, the value of sum_of_4_low is >=white-count (e.g. 3), the security mark detection module 212 confirms that the non-security mark portion is identified. Thereafter, the security mark detection module 212 checks for the transition from the non-security mark portion to the security mark portion. Therefore, once the non-security mark portion is identified, the security mark detection module 212 calculates the value of sum_of_4_high for a set and compares the value with another pre-defined threshold value, which is referred as black-count (such as, for example, but not limited to, 3). Based on the comparison, the security mark detection module 212 identifies the transition from the non-security mark portion to the security mark portion. For example, while analyzing the sets of data elements, whenever the security mark detection module 212 identifies that for a set the value of sum_of_4_high is >=black-count (e.g. 3), the security mark detection module 212 identifies that the array index corresponds to the transition point. Further, to identify the array index corresponding to the transition point, the security mark detection module 212 may select the $1^{st}$ element of the set as the transition point. For example, if a set of 4 elements including $5^{th}$, $6^{th}$, $7^{th}$ and $8^{th}$ elements satisfies the condition of the transition point. Then, the $5^{th}$ element is considered as the transition point. Once identified, the security mark detection module 212 records the array index as the transition point from the non-security mark portion to the security mark portion. And, the point is identified as the "white-to-black" transition point and stored for further processing. Further, to avoid any errors, post identification of the transition (from non-security mark portion to security mark portion) the security mark detection module 212 may check whether there have not been too many "non-white" elements (elements with a value greater than a threshold) to this point. Once the transition is identified, the security mark detection module 212 checks for the transition from the security mark portion to the non-security mark portion. Therefore, once the transition is identified, the security mark detection module 212 analyzes the subsequent set of data elements of the array to check for the transition from the security mark portion to the non-security mark portion. While analyzing, the security mark detection module 212 calculates the value of sum_of_4_low for a set and compares the value with the white-count (e.g., 3). Based on the comparison, the security mark detection module 212 identifies the transition from the security mark portion to the non-security mark portion. For example, while analyzing the sets of data elements, whenever the security mark detection module 212 identifies that the value of sum_of_4_low is >=white-count (say 3), the security mark detection module 212 identifies that the array index, say $1^{st}$ element of the set, corresponds to the transition point. Once identified, the security mark detection module

212 records the array index as the transition point from the security mark portion to the non-security mark portion and the point is identified as the "black-to-white" transition point and stored for further processing. In some configurations, if the condition corresponding to "black-to-white" transition happens too soon after the "white-to-black" transition, then the security mark detection module 212 may nullify the transition, and restart the search from that point. This way, the security mark detection module 212 analyzes the data elements of the array associated with the long-line.

Similarly, the security mark detection module 212 processes the data elements of the array associated with the short-line-1, which is processed to determine the beginning of the IR security mark. Therefore, the security mark detection module 212 first checks whether the non-security mark portion is identified, and once the non-security mark portion is identified, the security mark detection module 212 checks for the transition from the non-security mark portion to the security mark portion (i.e., white-to-black transition) to identify the beginning of the security mark. Further, the security mark detection module 212 checks for the black-to-white transition. The black-to-white transition is detected to eliminate the chance of false white-to-black transition detection, instead of detecting the security mark portion end.

The security mark detection module 212 processes the short-line-2 to determine the end of the security mark portion. Therefore, the security mark detection module 212 checks for the black-to-white transition, i.e., the transition from the security mark portion to the non-security mark portion. For this, while analyzing the data elements of the array, the security mark detection module 212 checks whether the value of sum_of_4_low is >=white-count (say 3). Once the condition is satisfied, the security mark detection module 212 records the array index as the "black-to-white" transition point, i.e., transition from the security mark portion to the non-security mark portion, and stores it for further processing.

Thereafter, the security mark detection module 212 analyzes the array indices corresponding to "white-to-black" and "black-to-white" transition points and identifies the actual pixel or scan line positions corresponding to the indices. The transition points are used to identify boundary points associated with the ROI or the IR security mark included in the ROI. Thereafter, using the actual pixel or scanline positions, the security mark detection module 212 calculates/determines the size of the possible security mark. Thereafter, the security mark detection module 212 compares the calculated size with a pre-defined size, i.e., a pre-stored size of the security mark. Here, the pre-defined size of the security mark is stored in the memory 210 of the multi-function device 200 and it may be provided by the user while submitting the document or may be stored in advance by an admin user. Based on the comparison, the security mark detection module 212 confirms the presence of the security mark. Once confirmed, the security mark detection module 212 determines the coordinates of the security mark/mark in the document. Thereafter, the security mark detection module 212 extracts and processes the security mark to determine the genuineness/authenticity of the security mark and therefore the document.

Continuing with FIG. 2 description, although the user interface 206 as shown in FIG. 2 is a part of the multi-function device 200, but the user interface 206 can be an external display or device that can be connected to the multi-function device 200. Further, the user interface 206 displays various options to the user such as scan, print, security mark detection workflow, etc. The user interface 206 further receives input from the user.

The memory 210 stores relevant information used for implementing the current disclosure. For example, the memory 210 temporarily stores size information, i.e., the pre-defined size, related to the IR security mark, which is pre-defined or obtained from the user. The memory 210 may also store the pre-determined threshold value related to the IR security mark. Further, the memory 210 maintains a repository of different infrared security marks and information related to it. The information includes embedded hidden mark/text/images. Any details stored in the memory 210 may be retrieved by the controller 208, the security mark detection module 212, or other components for implementing the current disclosure.

FIG. 4 represents a method 400 for detecting one or more infrared security marks embedded in a document. The method 400 may be implemented at a multi-function device, such as the multi-function device 102 of FIG. 1, the multi-function device 200 of FIG. 2. The method 400 can be implemented at any equivalent device with scanning functionality, and so on.

The method 400 begins when a user submits a document at the multi-function device. The document includes confidential content, such as text, image, signature, etc., and one or more IR security marks. The document can be a multi-page document and may include the IR security mark on one or more pages of the confidential document. The IR security mark includes hidden marks which can be in the form of texts, images, signs, or a combination thereof. And, the hidden marks are surrounded or hidden by a pattern such that the user cannot see it with the naked eye. The pattern can be a dot pattern and collectively, the pattern and the hidden marks can be referred to as a security mark or IR security mark/patch. Additionally, the hidden marks, i.e., the embedded text/image can be horizontally aligned or can be vertically aligned. In the context of the disclosure, the IR security mark including the horizontally aligned hidden marks is referred as horizontal security mark and the security mark including the vertically aligned hidden marks is referred as vertical security mark. Furthermore, the IR security mark/mark can be located at one or more pre-defined locations in the document. In the context of the disclosure, a security mark, i.e., the horizontal security mark and the vertical security mark, can be located at four pre-defined locations in the document including top right, bottom right, top left and bottom left. Therefore, in a document or a page of a document, the security mark/mark can be located at eight pre-defined locations including four locations corresponding to the horizontal security mark and four locations corresponding to the vertical security mark.

At 402, the document including the IR security mark at one or more pre-defined locations is received. In some configurations, the document is a physical document and the document is submitted for scanning. In some configurations, the document is a digital document and the document is submitted for printing. Further, as discussed earlier, a document includes eight pre-defined locations including four pre-defined locations corresponding to the horizontal security mark and four pre-defined locations corresponding to the vertical security mark. In the context of the disclosure, the regions of the received document corresponding to pre-defined locations are referred as regions of interest (ROI), the regions corresponding to the pre-defined locations of the horizontal security mark are referred as horizontal ROI and the regions corresponding to the pre-defined locations of vertical security mark are referred as vertical ROI. Therefore, the document including eight ROIs is received wherein the ROIs correspond to pre-defined locations in the document where the security marks are expected to be present.

Once received, at 404, the received document is processed, specifically, the one or more ROIs in the received document are processed. While processing the ROIs, the color values of pixels of different portions of the ROIs are processed. For this, one or more data collection regions are used and while processing, the color values of pixels covered by the different data collection regions are analyzed. Here, three data collection regions are used which include a long data collection region and two short data collection regions. The long data collection region is referred as long-line and two short data collection regions are referred as short-line-1 and short-line-2. The long-line (long data collection region) is used to process the central portion of the ROI and the other two data collection regions, i.e., the short-line 1 and short-line 2 are used to process the two ends of the ROI.

To process the portions/pixels covered by the different data collection regions (i.e., the longline, short-line 1 and short-line 2), multiple sample pixels are selected from a plurality of rows of pixels covered by the data collection regions. The selected sample pixels are compared with neighboring pixels for further analysis. Here, the sample pixels are selected from the plurality of rows of pixels, such that there is a gap of pre-defined number of rows between the two rows including the sample pixels. Further, for a row, (including the sample pixels) multiple sample pixels are selected. And, the gap between the adjacent sample pixels is pre-defined. Thereafter, the selected sample pixels are compared with neighboring pixels. Here, the neighboring pixels are pixels that are in the same row as the sample pixel and are at a pre-defined distance from the sample pixel in a pre-defined direction. In some configurations, for a ROI located at top left and bottom left, the pre-defined direction is towards the right from the sample pixel, and for a ROI located at the top right and bottom right, the pre-defined direction is towards the left from the sample pixel. While comparing, the color value of the sample pixels is compared with the neighboring pixels. In some configurations, if the pixel values are represented in RGB color space, then the differences for three color channels are calculated. Based on the comparison, a counter value associated with the row or column including the sample pixel is updated. For instance, if the difference between the color value of the sample pixel and the neighboring pixel is greater than a pre-defined threshold, the counter value associated with the row or column including the sample pixel is incremented. To accomplish this, a counter value is assigned corresponding to a row or column including the sample pixel. For example, to analyze the long-line for the horizontal ROI or short-lines for the vertical ROI, a counter value is assigned corresponding to a row including the sample pixel. And, to analyze the short-lines of the horizontal ROI or the long-line of vertical ROI a counter value is assigned corresponding to a column including the sample pixel. Further, the counter values are stored in memory locations associated with a data collection region of the ROIs, and the counter values are initially set as a pre-defined value such as, for example, but not limited to, '0'. This way, different portions of the ROIs are analyzed and based on the analysis, one or more array of counters/counter values corresponding to the different portions of ROIs are generated.

One or more ROIs can be processed parallelly. The received document is segmented into multiple tiles and the document is processed on tile-by-tile basis. The tile includes a portion or a strip of the received document (image or scanned data) such that the width of the tile (i.e., span in the horizontal direction) is same as (or close to) the width of the image. The tile can include multiple rows of pixels that is the height (i.e., span in the vertical direction) of the tile. The height of the tile can be smaller or greater than the height of the ROI. To process an ROI, multiple tiles are processed, i.e., the tiles covering the ROI. A tile may partially cover multiple ROIs when the width of the tile is equal to (or same as) the width of the document, and the portion of the document that the tile covers may include portions of different ROIs. While processing the one or more tiles, data are collected corresponding to different portions of the ROIs covered by the tiles. To process the ROIs and their portions parallelly, a thread, for example, but not limited to, a worker thread, is assigned to process the one or more tiles and thus the portions of the one or more ROIs covered by the tiles. While processing the tiles, the threads collect data related to the portions of different ROIs covered by the processed tiles. The threads process the assigned one or more tiles in parallel. Different threads are assigned to process the document in parallel on tile-by-tile basis. Memory locations are assigned/allocated for the thread to store data collected from the tiles. Corresponding to the portion (i.e., long-line, short-line-1 and short-line-2) of the ROIs, memory is assigned to the thread to store data (i.e., counter values). Upon processing the one or more tiles covering portions of multiple ROIs, the thread stores the collected data in the memory locations. The threads are assigned to process the one or more tiles and collect data related to the one or more portions of the ROIs covered by the tiles, and store the data, i.e., the counter values in the memory locations associated with the ROI. Upon processing, the threads generate one or more array of counters corresponding to one or more portions of a ROI covered by the processed tiles. Specifically, one or more arrays of counters are generated corresponding to a data collection region of the ROIs.

Once obtained, the one or more arrays of counters associated with the data collection region are combined to create an array of counters. For example, post analysis, if three arrays of counters are obtained corresponding to the data collection region (i.e., long-line, short-line-1 and short-line-2) associated with the top left horizontal ROI, the three arrays of counters associated with the long-line are combined to create an array of counters. The three arrays of counters associated with short-line-1 and short-line-2 are combined to generate one array of counters respectively for the short-line-1 and short-line-2. Three arrays of counters are generated corresponding to the ROI, including one for long-line, one for short-line-1 and one for short-line-2.

A filtration operation is performed on data elements included in the three arrays associated with a ROI. For this, the value of the data element is compared with a threshold value. The threshold value is different for different arrays. For example, the threshold value for the array associated with the long-line can be 26 and for the short-line can be 8. Based on the comparison, the value of one or more data elements included in the arrays is corrected. The value of the neighboring data element can be considered while correcting the value. In some configurations, if the value of a data element is lower than the threshold value (say 26) and the value of immediate neighbors on both sides are higher than the threshold value, the value is corrected or the value of the data element is set as a predetermined high value, say 27. A corrected array of counters is generated corresponding to the data collection region associated with the ROIs.

At 406 the arrays associated with the ROI are analyzed to identify the ROI which includes the security mark. The data elements of the arrays are processed to identify transition points, i.e., the points at which transition occurs from a non-security mark portion to a security mark portion and vice versa. Specifically, the arrays are analyzed to identify the data element at/after which the values of the data element in the array change. Accordingly, the transition points are identified which indicate the point at which transition occurs from a non-security mark portion (referred to herein as a white portion) to a security mark portion (referred to herein as a black portion) and from the security mark portion to the non-security mark portion. The point at which the transition occurs from the non-security mark portion to the security mark portion is referred to as "white-to-black" transition point and the point at which the transition occurs from the security mark portion to the non-security mark portion is referred as "black-to-white" transition point. A set of four data elements is selected. In some configurations, the data elements are selected using a sliding window, i.e., after selecting the first four data elements of the array, (e.g., data elements 1, 2, 3, and 4), the first data element is left and the next four data elements (i.e., data elements 2, 3, 4 and 5) are selected, similarly, the next four data elements (i.e., 3, 4, 5, 6) are selected and so on. For the set of four elements, a count of the number of elements that are greater than a threshold high value (e.g. 24) and a count of number of elements that are smaller than a threshold low value (e.g. 7) are calculated. The count/number of data elements that are greater than a threshold high value is referred to as sum_of_4_high and the count/number of data elements that are smaller than a threshold low value is referred to as sum_of_4_low. The values of counts (i.e., sum_of_4_high and sum_of_4_low) are used to identify the transition points in the arrays associated with the different data collection regions.

While processing the array associated with the longline, first the data elements are analyzed to check whether a non-security mark portion is identified. Once the non-security mark portion is identified, the data elements are analyzed to check for the transition from the non-security mark portion to the security mark portion to identify the beginning of the security mark. Thereafter, the data elements are analyzed to check for the transition from the security mark portion to the non-security mark portion to identify the end of the security mark. To identify the non-security mark portion, the value of sum_of_4_low is compared with a pre-defined threshold value, which is referred as white-count (for example, but not limited to, three). Based on the comparison, the beginning of the non-security mark portion is detected. For example, if the value of sum_of_4_low for a set is ≥white-count (e.g. 3), then it is confirmed that the non-security mark portion is identified. Once the non-security mark portion is identified, the sets of data elements of the array are analyzed to check for the transition from the non-security mark portion to the security mark portion. The value of sum_of_4_high for the set is compared with a pre-defined threshold value, referred to herein as black-count (for example, but not limited to, 3). Based on the comparison, the transition from the non-security mark portion to the security mark portion is detected. For example, while analyzing the data elements, the value, i.e., sum_of_4_high is compared with the black-count (e.g. 3), and whenever the value of the set is identified as greater than or equal to the black-count, the corresponding array index (e.g., array index of the first element of the set) is identified as the transition point. The array index is recorded as the transition point from the non-security mark portion to the security mark portion. The point is identified as the "white-to-black" transition point and stored for further processing. Post identification of the transition from non-security mark portion to security mark portion, the data elements are checked to ensure whether there have not been too many "non-white" elements (elements with a value greater than a threshold) to this point. Once the transition is identified, the sets of data elements of the array are analyzed to check for the transition from the security mark portion to the non-security mark portion. The value of sum_of_4_low for the set is calculated and compared with the white-count (e.g., 3). Based on the comparison, the transition from the security mark portion to the non-security mark portion is identified. For example, the value, i.e., sum_of_4_low is compared with the white-count (e.g. 3), and whenever the value of a set is identified as greater than or equal to the white-count, the corresponding array index is identified as the transition point. Once identified, the array index is recorded as the transition point from the security mark portion to the non-security mark portion and the point is identified as the "black-to-white" transition point and stored for further processing. In some configurations, if the condition corresponding to "black-to-white" transition happens too soon after the "white-to-black" transition, then the transition can be nullified, and the search for the transition point restarts.

The data elements of the array associated with the short-line-1 are analyzed, which is processed to determine the beginning of the security mark portion. The data elements are analyzed to check whether the non-security mark portion is identified, and, once the non-security mark portion is identified, the data elements are analyzed to check for the transition from the non-security mark portion to the security mark portion (i.e., white-to-black transition) to identify the beginning of the security mark. The data elements are analyzed to check for the black-to-white transition. The black-to-white transition is detected to eliminate the chance of false white-to-black transition detection. The data elements of the array associated with short-line-2 are analyzed to determine the end of the security mark portion. The data elements are analyzed to check for the black-to-white transition, i.e., the transition from the security mark portion to the non-security mark portion. The data elements are analyzed and a value, i.e., sum_of_4_low, is calculated for the set of data elements and compared with the pre-defined threshold value (white-count) to determine the transition point. For example, the value, i.e., sum_of_4_low, is compared with the white-count (e.g. 3). When the value of the set is identified as greater than or equal to the white-count, the corresponding array index is identified as the transition point. The array index is recorded as the transition point from the security mark portion to the non-security mark portion and the point is identified as the "black-to-white" transition point and stored for further processing. One or more transition points associated with the one or more pre-defined locations or ROIs is identified.

At 408, the transition points are used to calculate the size of the one or more IR security marks. The array indices corresponding to "white-to-black" and "black-to-white" transition points are used to identify the pixel or scan line positions. The pixel or scan line positions are used to determine the coordinates of the security mark that are used to calculate the size of the possible security mark.

At 410, the calculated size is compared with a pre-defined size, for example, but not limited to, a pre-defined size of the security mark. The pre-defined size of the security mark can be, for example, pre-stored, and/or provided by the user while submitting the document, or may be stored in advance by an admin user.

At 412, based on the comparison, the presence of the security mark is confirmed. The coordinates of the security mark/mark in the document are determined. The one or more IR security marks embedded in the document are detected using the coordinates. The security mark is extracted and processed to determine/detect the genuineness/authenticity of the security mark and therefore the document. Based on the detection, one or more actions are taken, for example, an owner of the document or an admin user is notified, or processing of the document is aborted if the document including the IR security mark is submitted for printing/scanning/copying.

The present disclosure discloses methods and systems for detecting infrared security marks embedded in documents. Specifically, the methods and systems identify and confirm the location of the security mark in the document to extract and ascertain the authenticity of the security mark and the authenticity/genuineness of the document. The methods and systems enable scanning devices such as multi-function devices to read the IR security mark embedded in the document. Therefore, the methods and systems reduce or remove dependency on dedicated IR scanners. Further, according to the disclosure, only regions of interest (ROIs) or pre-defined locations in the received document are analyzed to identify and confirm the location of the security mark in the document. Therefore, the methods and systems propose a solution in which processing is reduced. Furthermore, the methods and systems facilitate parallel processing of the ROIs, thus the methods and systems facilitate faster processing. Furthermore, while processing, the document is segmented into multiple tiles and the document is processed on tile by tile basis, therefore, the solution adjusts image buffering. Furthermore, while processing, the sample pixels are analyzed, and based on the analysis, counters or counter values are updated or incremented, and these counters or arrays of counters are analyzed to locate the ROI including the security mark. This allows error-free parallel processing of the tiles, as the tiles can be processed in any order, for example, after processing the $1^{st}$ tile, $5^{th}$ tile can be processed. Therefore, the methods and systems facilitate error-free parallel processing of the tiles and thus the ROIs In an aspect, a method for detecting one or more infrared (IR) security marks embedded in a document includes, but is not limited to including, receiving a document comprising one or more regions of interest (ROIs), wherein the ROIs correspond to pre-defined locations in the document; processing the one or more ROIs to generate a plurality of arrays of counters corresponding to a ROI of the one or more ROIs; analyzing the plurality of arrays of counters to identify a plurality of transition points corresponding to a ROI including the IR security mark; calculating, using the transition points, size of the one or more IR security marks; comparing the calculated size of the one or more IR security marks with a pre-defined size; and based on the comparison, detecting the one or more IR security marks embedded in the document for further analysis.

In an aspect, the method wherein processing the one or more ROIs further comprises analyzing one or more portions of a ROI covered by one or more data collection regions.

In an aspect, the method wherein the one or more data collection regions comprise at least one of a long-line, a short-line-1 and a short-line-2.

In an aspect, the method wherein the processing the one or more ROIs further comprises: selecting a plurality of sample pixels from a plurality of rows of pixels covered by the one or more data collection regions; comparing color values of the selected sample pixels with neighboring pixels; based on the comparison, updating a counter value associated with a row or a column including the sample pixel.

In an aspect, the method wherein analyzing the plurality of arrays of counters comprises: selecting a plurality of sets of data elements from a array of counters, wherein a set comprises at least four data elements; for a set, calculating at least one of a sum_of_4_low value and a sum_of_4_high.

In an aspect, the method further comprising comparing the calculated sum_of_4_low value for the set with a pre-defined white-count value to determine at least one of a black-to-white transition point or a point corresponding to a white portion.

In an aspect, the method further comprising comparing the calculated sum_of_4_high value for the set with a pre-defined black-count value to determine at least one of a white-to-black transition point or a point corresponding to a black portion.

In an aspect, the method further comprising segmenting the received document into plurality of tiles.

In an aspect, the method further comprising parallelly processing the plurality of tiles.

In an aspect, a multi-function device for detecting one or more infrared (IR) security marks embedded in a document, the multi-function device comprising: a controller for receiving a document comprising one or more regions of interest (ROIs), wherein the ROIs correspond to pre-defined locations in the document; a security mark detection module for: processing the one or more ROIs to generate a plurality of arrays of counters corresponding to a ROI; analyzing the plurality of arrays of counters to identify a plurality of transition points corresponding to a ROI including the IR security mark; calculating, using the transition points, size of one or more IR security marks; comparing the calculated size of the one or more IR security marks with a pre-defined size; and based on the comparison, detecting the one or more IR security mark embedded in the document for further analysis.

In an aspect, the multi-function device wherein processing the one or more ROIs further comprises analyzing one or more portions of a ROI covered by one or more data collection regions.

In an aspect, the multi-function device wherein the one or more data collection regions comprises at least one of a long-line, a short-line-1 and a short-line-2.

In an aspect, the multi-function device wherein the processing the one or more ROIs further comprises: selecting a plurality of sample pixels from a plurality of rows of pixels covered by the one or more data collection regions; comparing color values of the selected sample pixels with neighboring pixels; based on the comparison, updating a counter value associated with a row or a column including the sample pixel.

In an aspect, the multi-function device wherein analyzing the plurality of arrays of counters comprises: selecting a plurality of sets of data elements from a array of counters, wherein a set comprises at least four data elements; for a set, calculating at least one of a sum_of_4_low value and a sum_of_4_high.

In an aspect, the multi-function device further comprising comparing the calculated sum_of_4_low value for the set with a pre-defined white-count value to determine at least one of a black-to-white transition point or a point corresponding to a white portion.

In an aspect, the multi-function device further comprising comparing the calculated sum_of_4_high value for the set with a pre-defined black-count value to determine at least one of a white-to-black transition point or a point corresponding to a black portion.

In an aspect, the multi-function device further comprising segmenting the received document into plurality of tiles.

In an aspect, the multi-function device further comprising parallelly processing the plurality of tiles.

In an aspect, a method for detecting one or more infrared (IR) security marks embedded in a document, the method comprising: receiving a document comprising one or more regions of interest (ROIs), wherein the ROIs correspond to pre-defined locations in the document; segmenting the received document into a plurality of tiles; assigning one or more worker threads to process one or more tiles of the plurality of tiles; upon processing, generating a plurality of arrays of counters corresponding to a ROI of the one or more ROIs; analyzing the plurality of arrays of counters to identify a plurality of transition points corresponding to a ROI including the IR security mark; identifying, using the transition points, coordinates of one or more IR security marks present in the document; calculating size of the one or more IR security marks using the coordinates of one or more IR security marks; comparing the calculated size of the one or more IR security marks with a pre-defined size; and based on the comparison, confirming the location of the one or more IR security marks in the document for detecting the one or more IR security mark embedded in the document.

In an aspect, the method wherein the processing comprises analyzing one or more portions of a ROI covered by one or more data collection regions, wherein the one or more data collection regions comprises at least one of a long-line, a short-line-1 and a short-line-2.

In an aspect, the method wherein the analyzing comprises: selecting a plurality of sample pixels from a plurality of rows of pixels covered by the one or more data collection regions; comparing color values of the selected sample pixels with neighboring pixels; and based on the comparison, updating a counter value associated with a row or a column including the sample pixel.

In an aspect, the method wherein analyzing the plurality of arrays of counters comprises: selecting a plurality of sets from an array of counters, wherein a set comprises four data elements; calculating a sum_of_4_low value and a sum_of_4_high value for a set.

In an aspect, the method further comprising comparing the calculated sum_of_4_low value for each set with a pre-defined white-count value to determine at least one of a black-to-white transition point or a point corresponding to a white portion.

In an aspect, the method further comprising comparing the calculated sum_of_4_high value for a set with a pre-defined black-count value to determine at least one of a white-to-black transition point or a point corresponding to a black portion.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. The method may be considered to be implemented in the above-described system and/or the apparatus and/or any electronic device (not shown).

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of symbolic representations of operations on data bits performed by computer components, including a central processing unit (CPU), memory storage devices for the CPU, and connected display devices. These descriptions and representations are the means used by those skilled in the data processing arts to convey the substance of their work to others skilled in the art.

These and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, identifying, classifying, detecting, or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The description herein relates to an apparatus for performing the operations discussed herein. A computer program may be stored in a computer readable storage medium, such as, but is not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, and each coupled to a computer system bus.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

The terminology used herein is to describe configurations in accordance with embodiments of the present disclosure and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method for detecting a mark embedded in a document, the method comprising:
   receiving the document comprising a region of interest (ROI), wherein the ROI corresponds to a ROI location in the document;
   generating an array of counters corresponding to the ROI;
   identifying, based on the array of counters, a transition point corresponding to the ROI including the mark;
   calculating, using the transition point, a size of the mark;
   comparing the calculated size with a pre-defined size; and
   based on the comparison, detecting the mark in the document.

2. The method of claim 1, wherein the mark comprises: an infrared (IR) mark.

3. The method of claim 1, wherein the mark comprises: a security mark.

4. The method of claim 1, wherein the ROI location comprises:
   a pre-defined location.

5. The method of claim 1, further comprising:
   determining the ROI location automatically or manually.

6. The method of claim 1, wherein the ROI comprises:
   a data collection region.

7. The method of claim 6, wherein the data collection region comprises:
   at least one of a long-line, a short-line-1 and a short-line-2.

8. The method of claim 6, wherein generating the array of counters comprises:
   selecting a plurality of sample pixels from a plurality of rows of pixels in the data collection region;
   comparing values of the selected plurality of sample pixels with neighboring pixels; and
   updating, based on the comparison, a counter value associated with a row or a column including the plurality of sample pixels.

9. The method of claim 1, wherein identifying, based on the array of counters, the transition point comprises:
   selecting a set of data elements from the array of counters, wherein the set comprises at least four data elements; and
   calculating, from the set, at least one of a sum_of_4_low value and a sum_of_4_high.

10. The method of claim 9, further comprising:

comparing the calculated sum_of_4_low value with a pre-defined white-count value to determine at least one of a black-to-white transition point or a point corresponding to a white portion.

11. The method of claim 9, further comprising:

comparing the calculated sum_of_4_high value for the set with a pre-defined black-count value to determine at least one of a white-to-black transition point or a point corresponding to a black portion.

12. The method of claim 1, further comprising:

segmenting the received document into a plurality of tiles.

13. The method of claim 12, further comprising:

processing the plurality of tiles in parallel.

14. A computer system for detecting a mark embedded in a document, the computer system comprising:

a hardware processor;

a non-volatile storage medium storing instructions that when executed by the hardware processor perform operations comprising:

receiving the document comprising a region of interest (ROI), wherein the ROI corresponds to a ROI location in the document;

generating an array of counters corresponding to the ROI;

identifying, based on the array of counters, a transition point corresponding to the ROI including the mark;

identifying, using the transition point, coordinates of the mark;

calculating a size of the mark based on the coordinates;

comparing the calculated size with a pre-defined size; and based on the comparison, detecting the mark in the document.

15. The computer system of claim 14, wherein the mark comprises:

an infrared (IR) mark.

16. The computer system of claim 14, wherein the mark comprises:

a security mark.

17. The computer system of claim 14, wherein the ROI location comprises:

a pre-defined location.

18. The computer system of claim 14, wherein the operations further comprise:

segmenting the received document into a plurality of tiles; and assigning one or more worker threads to process one or more tiles of the plurality of tiles.

19. The system of claim 14, wherein the operations further comprise:

analyzing one or more portions of the ROI covered by one or more data collection regions, wherein the one or more data collection regions includes at least one of a long-line, a short-line-1 and a short-line-2;

selecting a plurality of sample pixels from a plurality of rows of pixels covered by the one or more data collection regions;

comparing color values of the selected sample pixels with neighboring pixels; and based on the comparison, updating a counter value associated with a row or a column including the sample pixel, wherein analyzing the plurality of arrays of counters includes:

selecting a plurality of sets from each array of counters, wherein each set comprises four data elements;

calculating a sum_of_4_low value and a sum_of_4_high value for each set;

comparing the calculated sum_of_4_low value for each set with a pre-defined white-count value to determine at least one of a black-to-white transition point or a point corresponding to a white portion; and comparing the calculated sum_of_4_high value for each set with a pre-defined black-count value to determine at least one of a white-to-black transition point or a point corresponding to a black portion.

20. A computer program product for detecting a mark embedded in a document, the computer program product comprising a computer-readable storage medium having program instructions embodied therewith, the program instructions executable by a computing device to cause the computing device to perform operations comprising:

receiving the document comprising a region of interest (ROI), wherein the ROI corresponds to a location in the document;

generating an array of counters corresponding to the ROI;

identifying, based on the array of counters, a transition point corresponding to the ROI including the mark;

calculating, using the transition point, a size of the mark;

comparing the calculated size with a pre-defined size; and based on the comparison, detecting the mark in the document.

\* \* \* \* \*